United States Patent
Carlson

(10) Patent No.: US 6,697,849 B1
(45) Date of Patent: Feb. 24, 2004

(54) SYSTEM AND METHOD FOR CACHING JAVASERVER PAGES™ RESPONSES

(75) Inventor: Bjorn Carlson, Mtn View, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/561,698

(22) Filed: May 1, 2000

Related U.S. Application Data

(60) Provisional application No. 60/148,794, filed on Aug. 13, 1999.

(51) Int. Cl.[7] .............................................. G06F 15/16
(52) U.S. Cl. ...................... 709/219; 709/203; 709/217; 711/124; 711/141
(58) Field of Search ................................ 709/219, 203, 709/217, 218; 711/119, 121, 124, 126, 130, 141, 144, 166

(56) References Cited

U.S. PATENT DOCUMENTS

| | | | | |
|---|---|---|---|---|
| 5,852,717 A | * | 12/1998 | Bhide et al. ................ | 709/203 |
| 6,098,093 A | * | 8/2000 | Bayeh et al. ............... | 709/203 |
| 6,119,153 A | * | 9/2000 | Dujari et al. ............... | 709/218 |
| 6,178,461 B1 | * | 1/2001 | Chan et al. ................. | 709/247 |
| 6,185,608 B1 | * | 2/2001 | Hon et al. .................. | 709/216 |
| 6,253,234 B1 | * | 6/2001 | Hunt et al. ................. | 709/213 |
| 6,332,163 B1 | * | 12/2001 | Bowman-Amuah ......... | 709/231 |
| 6,377,991 B1 | * | 4/2002 | Smith et al. ................ | 709/226 |
| 6,480,865 B1 | * | 11/2002 | Lee et al. ................... | 707/523 |

OTHER PUBLICATIONS

"The Effect of Consistency on Cache Response Time", Dilley, Hewlett–Packard Laboratories, Sep. 28, 1999.*

* cited by examiner

Primary Examiner—Ario Etienne
Assistant Examiner—LaShonda Jacobs
(74) Attorney, Agent, or Firm—Meyertons Hood Kivlin Kowert & Goetzel, P.C.; B. Noël Kivlin

(57) ABSTRACT

System and method for caching JavaServer Page™ (JSP) component responses. The JSP components may be components that execute on an application server that supports networked applications, such as web applications or other Internet-based applications. One or more client computers, e.g., web servers, may perform requests referencing the JSP components on the application server. The execution of JSP components may be managed by a JSP engine process running on the application server. When a request referencing a JSP is received from a client computer, the JSP engine may first check a JSP response cache to determine whether a valid JSP response satisfying the request is present. If a matching cached response is found, then the response may be retrieved and immediately streamed back to the client. Otherwise, the referenced JSP may be executed. Each JSP file may comprise various SetCacheCriteria( ) method calls. When executed, the SetCacheCriteria( ) call may cause the output of the JSP to be cached once the JSP execution is complete. Arguments to the SetCacheCriteria( ) call may specify a criteria set that should be associated with the cached JSP response. This criteria set may then be used to match against attributes of future JSP requests, as described above. In particular embodiments, any of various types of cache criteria may be supported.

20 Claims, 23 Drawing Sheets

| Server Load Criteria | Description |
|---|---|
| CPU Load | The average percentage of time all processors in the server are in use |
| Disk Input/Output | The rate at which the system is issuing read and write operations to the hard disk |
| Memory Thrash | The number of pages read from or written to the hard disk to resolve memory references to pages that were not in memory at the time of the reference |
| Number of Requests Queued | The number of user and application requests a server is currently processing |
| Server Response Time | Average response time from the server for all application components |

*Fig. 8*

| Application Component Performance Criteria | Description |
|---|---|
| Cached Results Available | Signals whether the execution results of the application component are cached |
| Lowest Average Execution Time | The time the application component takes to run on each application server |
| Most Recently Executed | The application server that most recently ran the application component |
| Fewest Executions | The number of times the application component has run on each application server |
| Application Component Response Time | Average response time from a specific application server for the application component |

*Fig. 9*

Load Balancing Method:

Load Balancing: | User Defined Criteria (Nas Driven) ▼ |

Server Load Critera | Application Component Criteria | Advanced Settings

Base BroadcastUpdate Interval: |10| seconds

Broadcast Intervals

Server Load: |10| seconds
Application Component Criteria: |20| seconds

Update Intervals

Server Load: |10| seconds
CPU Load: |10| seconds
Disk I/O: |10| seconds
Memory Thrash: |10| seconds
Number of requests Queued: |10| seconds Maximum Hops: |1|

*Fig. 13*

Application Group

Group Name Default

Set Application Group Access Control...

Application Group Components

| Component | Type | Enabled | Mode | Sticky LB |
|---|---|---|---|---|
| Bean GXApp.nsOnlineBookstore.account.IBookA... | Java | ☑ | Local | ☐ |
| Bean GXApp.nsOnlineBank.user.IUserDetails | Java | ☑ | Local | ☐ |
| Bean GXApp.nsOnlineBank.dataaccess.IData.Ac... | Java | ☑ | Local | ☑ |
| Bean GXApp.nsOnlineBookstore.cart.IShoppingC... | Java | ☑ | Local | ☐ |
| Servlet nsOnlineBookstore_Bookstore | Java | ☑ | Local | ☐ |
| Bean GXApp.nsOnlineBookstore.cashier.ICashier | Java | ☑ | Local | ☐ |
| Bean GXApp.nsOnlineBank.customer.IBankCusto... | Java | ☑ | Local | ☐ |

*Fig. 14*

Server Log | HTTP Log

☑ Enable Server Event Log

LogTarget

☑ Log to a Database

Data Source: eventlog    Username: Kdemo

Data Source: ksample    Password: *********

Table Name: eventlog

☑ Log to Console    ☑ Log Errors to WinNT Application Log

☑ Log to file

File name: logs\nas

Enable. File Rotation: Yes ▶    Rotation Interval: Every Hour ▶

General

Message Type: Errors and Warnings ▶

Maximum Entries: 100

Write Interval: 60

*Fig. 20*

| Database field name | Description | Data type |
|---|---|---|
| evttime | Date and time the message was created | Date/Time |
| evttype | Message type, such as information, warning, or error | Number |
| evtcategory | Service or application component ID | Number |
| evtstring | Message text | Text |

*Fig. 21*

| Default HTTP variables | Default database field name | Data type |
|---|---|---|
| N/A | logtime | Date/Time |
| CONTENT_LENGTH | content_length | Number |
| CONTENT_TYPE | content_type | Text |
| HTTP_ACCEPT | accept | Text |
| HTTP_CONNECTION | connection | Text |
| HTTP_HOST | host | Text |
| HTTP_REFERER | referer | Text |
| HTTP_USER_AGENT | user_agent | Text |
| PATH_INFO | uri | Text |
| REMOTE_ADDR | ip | Text |
| REQUEST_METHOD | method | Text |
| SERVER_PROTOCOL | protocol | Text |

*Fig. 22*

SYSTEM AND METHOD FOR CACHING JAVASERVER PAGES™ RESPONSES

This application claims the benefit of provisional patent application Ser. No. 60/148,794, entitled "Application Server", filed Aug. 13, 1999.

BACKGROUND OF THE INVENTION

1. Field of the Invention

The present invention relates to the field of application servers, and more particularly to a system and method for caching JavaServer Pages™ responses.

2. Description of the Related Art

The field of application servers has recently become one of the fastest-growing and most important fields in the computing industry. As web applications and other distributed applications have evolved into large-scale applications that demand more sophisticated computing services, specialized application servers have become necessary, in order to provide a platform supporting these large-scale applications. Applications that run on application servers are generally constructed according to an n-tier architecture, in which presentation, business logic, and data access layers are kept separate. The application server space is sometimes referred to as "middleware", since application servers are often responsible for deploying and running the business logic layer and for interacting with and integrating various enterprise-wide resources, such as web servers, databases, and legacy systems.

Application servers offer significant advantages over previous approaches to implementing web applications, such as using common gateway interface (CGI) scripts or programs. FIG. 1 illustrates a typical architecture for a web application utilizing CGI scripts or programs. The client computer running a web browser 10 may reference a CGI program 18 on the web server 14, e.g., by referencing a URL such as "http://server.domain.com/cgi-bin/myprogram.pl" over an Intranet or the Internet 12. Generally, the CGI program runs on the web server itself, possibly accessing a database 20, e.g. in order to dynamically generate HTML content, and the web server returns the output of the program to the web browser. One drawback to this approach is that the web server may start a new process each time a CGI program or script is invoked, which can result in a high processing overhead, impose a limit on the number of CGI programs that can run at a given time, and slow down the performance of the web server. In contrast, application servers typically provide a means for enabling programs or program components that are referenced via a URL to run on a separate computer from the web server and to persist between client invocations.

Another common drawback of previous web application design models, such as the use of CGI programs, is related to data access. For example, if a CGI program needs to access a database, the program typically opens a database connection and then closes the connection once it is done. Since opening and closing database connections are expensive operations, these operations may further decrease the performance of the web server each time a CGI program runs. In contrast, application servers typically provide a means to pool database connections, thus eliminating or reducing the need to constantly open/close database connections. Also, data access in CGI programs is generally coded at a relatively low level, e.g., using a specific dialect of SQL to access a specific type of database. Thus, portions of the application may need to be recoded if the database is replaced with a new type of database. Application servers, on the other hand, may provide a database service for applications to utilize as an interface between the application and the database, which can serve to abstract the application from a particular type of database.

Application servers may also provide many other types of application services or may provide standard reusable components for tasks that web applications commonly need to perform. Application servers often incorporate these services and components into an integrated development environment specialized for creating web applications. The integrated development environment may leverage various standard software component models, such as the Common Object Request Broker Architecture (CORBA), the (Distributed) Component Object Model (COM/DCOM), Enterprise JavaBeans™ (EJB), etc., or the integrated development environment may provide its own software component model or may extend standard component models in various ways.

The following list is a partial list of the types of application services or application components that application servers may provide. By leveraging these types of integrated, pre-built services and components, web application developers may realize a significant reduction in application development time and may also be able to develop a more robust, bug-free application. Application servers from different vendors differ, of course, in the types of services they provide; thus, the following list is exemplary only.

- As noted above, application servers may provide data access services for accessing various types of databases, e.g. through directly supporting proprietary databases, such as SAP, Lotus Notes, CICS, etc., or through standardized interfaces, such as ODBC, JDBC, etc. Also, as noted above, application servers may enable database connection pooling or caching.
- Application servers may also provide services for accessing network directories, such as directories that support the standard Lightweight Directory Access Protocol (LDAP).
- Application servers may also provide application security services or components. Web application security may be considered at different levels, such as: client-to-server communication, application-level privileges, database access, directory service access, etc. Application server security-related services/components may include support for performing user authentication, performing data encryption, communicating via secure protocols such as Secure Sockets Layer (SSL), utilizing security certificates, programming user access rights, integrating with operating system security, etc.
- Application servers may also provide services enabling a web application to easily maintain user state information during a user session or across user sessions. Performing state and session management is especially important for applications that have complex, multi-step transactions.
- Application servers may also support caching the results of application logic execution or caching the results of web page/component output, so that for appropriate subsequent requests, the results may be reused.
- Application servers may also support result streaming, such as dynamically streaming HTTP output, which may be especially useful for large result sets involving lengthy queries. A related service may enable an application to easily display a large result set by breaking the result set down into smaller groups and displaying these groups to the user one at a time.

Many web applications need to perform various types of searching or indexing operations. Application servers may also provide application services for indexing or searching various types of documents, databases, etc.

As noted above, many web applications may perform various types of complex, multi-step transactions. Application servers may also provide support for managing these application transactions. For example, this support may be provided via a software component model supported by the application server, such as the Enterprise JavaBeans™ component model, or via integration with third-party transaction process monitors, etc.

It is often desirable to enable web applications to perform certain operations independently, as opposed to in response to a user request. For example, it may be desirable for an application to automatically send a newsletter to users via email at regularly scheduled intervals. Application servers may support the creation and scheduling of events to perform various types of operations.

Many types of web applications need to perform e-commerce transactions, such as credit card transactions, financial data exchange, etc. Application servers may provide services for performing various types of e-commerce transactions or may provide an integrated third-party e-commerce package for applications to use.

Web applications often need to utilize various types of standard network application services, such as an email service, FTP service, etc. Application servers may provide these types of services and may enable applications to easily integrate with the services.

Web applications often need to log various conditions or events. Application servers may provide an integrated logging service for web applications to use.

Judging by the exemplary list above of computing services that application servers may provide for web applications, it is apparent that application servers may integrate a diverse range of services, where these services may interact with many different types of servers, systems, or other services. For example, an application server may act as a platform hub connecting web servers, database servers/services, e-commerce servers/services, legacy systems, or any of various other types of systems or services. A key benefit of many application servers is that they not only provide this service/system integration, but typically also provide centralized administrative or management tools for performing various aspects of system and application administration.

For example, application servers may provide management tools related to application development and deployment, such as tools for source code control and versioning, bug tracking, workgroup development, etc. Application servers may also provide tools related to application testing and deployment, such as tools for application prototyping, load simulation, dynamic code base updates, etc. Application servers may also provide tools for easily configuring the application to utilize various of the application server services described above. For example, administrators may use a tool to set the result caching criteria for particular application components or pages, or may use a tool to specify which documents to index or to specify indexing methods, etc.

One important class of application server administrative tools pertains to real-time application management and monitoring. Application servers may provide tools for dynamically managing various factors affecting application performance, e.g. by adjusting the application services and support features described above. For example, application server tools may allow administrators to:

dynamically adjust the number of database connections maintained in a database pool, in order to determine the optimum pool size for maximum performance clear or resize application output caches dynamically change various aspects of system or application security schedule or trigger events, such as events for sending e-mail reports to application users, generating reports based on collected data, etc.

start and stop various application services, such as email or FTP services, from a centralized user interface This list is, of course, exemplary, and particular application servers may support different types of centralized application management.

In addition to the factors discussed above, many application servers also include means for providing various types of system reliability and fault tolerance. One common technique related to fault tolerance is known as application server "clustering". Application server clustering refers to tying together two or more application servers into a system. In some cases, this "tying together" may mean that application code, such as particular software components, is replicated on multiple application servers in a cluster, so that in the case of a hardware or software failure on one application server, user requests may be routed to and processed by other application servers in the cluster.

Application server clustering may also facilitate application performance and scalability. Application servers may be added to a cluster in order to scale up the available processing power by distributing work. Advantageously, application servers often enable this type of scaling up to be down without requiring changes to the application code itself.

Work may be distributed across an application server cluster in different ways. For example, as discussed above, application code may be replicated across multiple application servers in the cluster, enabling a given request to be processed by any of these multiple application servers. Also, application code may be logically partitioned over multiple servers, e.g., so that a particular application server is responsible for performing particular types of operations. This type of application partitioning may help application performance in various ways. For example, application partitioning may reduce the need for an application server to perform context switching between different types of operations, such as CPU-intensive operations versus input/output-intensive operations. Also, application partitioning may be used to match application processing to various physical characteristics of a system, such as network characteristics. For example, data-intensive application logic may be configured to run on an application server that is closest to a data source, in order to reduce the latencies associated with accessing remotely located data.

In the case of application code replication, where multiple application servers are capable of processing a given request, it is often desirable to route the request to the "best" application server currently available to process the request, i.e., to the application server that will enable the request to be processed and the request results to be returned to the client as quickly as possible. This mapping of client requests to application servers is known as application server load balancing.

As noted above, application servers may support caching the results of application logic execution or caching the results of web page/component output, so that for appropriate subsequent requests, the results may be reused. Given the types of applications that may run on application servers, such as web applications, this type of output caching may significantly enhance the performance of an application.

One type of component supported by many application servers is JavaServer Page™ components. JavaServer Pages™ (JSP) is a Java™ platform technology for building applications streaming dynamic content such as HTML, DHTML, XHTML and XML. JavaServer Pages is a Standard Extension that is defined on top of the Servlet Standard Extension. JSP 1.1 uses the classes from Java Servlet 2.1 specification. For more information on JavaServer Pages™, please refer to the JavaServer Pages™ Specification, Version 1.1, available from Sun Microsystems, Inc.

Although some existing application servers support output caching for JavaServer Pages™ responses, previous approaches to JSP response caching often suffer from various drawbacks. For example, it may be desirable to enable programmers to specify the response-caching criteria for each JSP component using a flexible programmatic means. It may also be desirable to improve upon the algorithms used to determine whether cached responses satisfy requests, in order to enhance performance.

SUMMARY OF THE INVENTION

The problems outlined above may in large part be solved by a system and method for caching JavaServer Page™ (JSP) component responses, as described herein. The JSP components may be components that execute on an application server that supports networked applications, such as web applications or other Internet-based applications. One or more client computers, e.g., web servers, may perform requests referencing the JSP components on the application server. The system may also be configured to utilize a cluster of application servers in which requests from the client computer(s) are distributed across different application servers.

The execution of JSP components may be managed by a JSP engine process running on the application server. When a request referencing a JSP is received from a client computer, the JSP engine may first check a JSP response cache to determine whether a valid JSP response satisfying the request is present. A JSP request may comprise various types of attributes, such as variable name and value pairs, that are matched against criteria sets associated with each response entry. If a matching cached response is found, then the response may be retrieved and immediately streamed back to the client. Otherwise, the referenced JSP may be executed.

Each JSP file may comprise code for specifying caching criteria for the JSP. This code may cause the output (or response) for the JSP to be cached once the JSP execution is complete, where the cache entry is associated with the specified caching criteria. The caching criteria may then be used to match against attributes of future JSP requests, as described above. The caching criteria may include a "time" argument indicating the number of seconds for which the cached response should be considered valid, a criteria string specifying attribute criteria to use in determining whether or not the cached response may be used to satisfy a request, etc. In particular embodiments, any of various types of cache criteria may be supported, as described below. The caching criteria may be specified in the JSP code in various ways, e.g., by a method invocation, by using markup tags, etc.

BRIEF DESCRIPTION OF THE DRAWINGS

Other objects and advantages of the invention will become apparent upon reading the following detailed description and upon reference to the accompanying drawings in which:

FIG. 8 illustrates a table of exemplary server load criteria that may be used in deciding which application server is best able to process a current request;

FIG. 9 illustrates a table of exemplary application component performance criteria that may be used in deciding which application server is best able to process a current request;

FIG. 13 illustrates an exemplary user interface screen for setting broadcast and update intervals for sharing load balancing information among application servers in an application server cluster;

FIG. 14 illustrates an exemplary user interface of a tool for enabling administrators to specify "sticky" load balancing for certain application components;

FIG. 20 illustrates an exemplary user interface of a tool for managing message logging;

FIG. 21 illustrates an exemplary type of database table for logging messages;

FIG. 22 illustrates an exemplary type of database table for logging HTTP requests.

Figure 1:
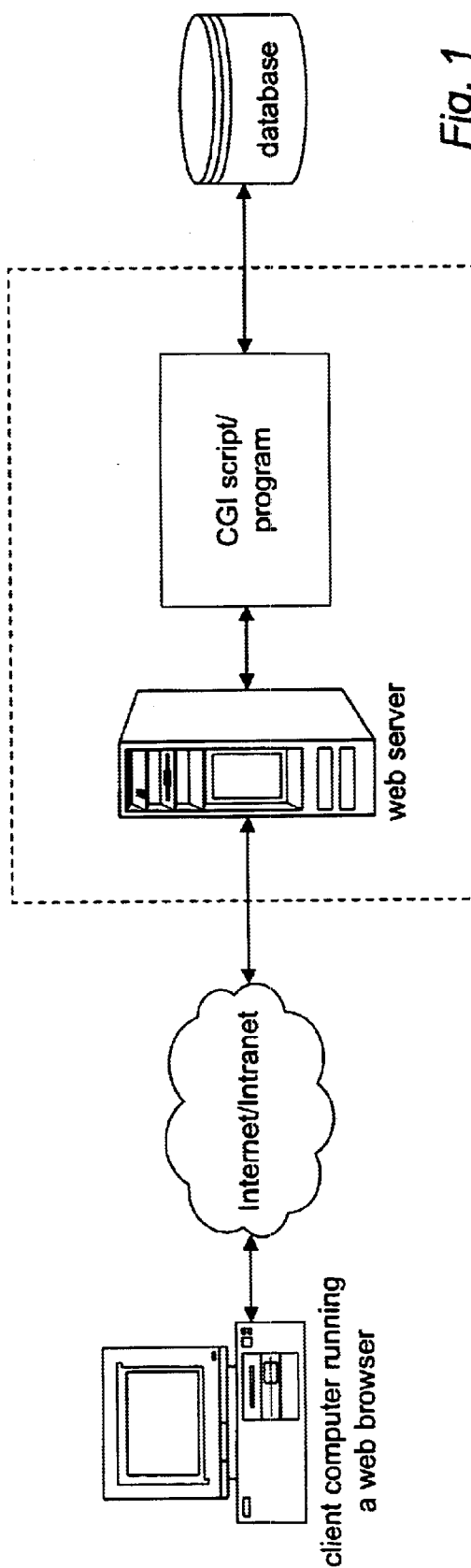
FIG. 1 illustrates a typical architecture for a web application utilizing CGI scripts or programs.

While the invention is susceptible to various modifications and alternative forms, specific embodiments are shown by way of example in the drawings and are herein described in detail. It should be understood however, that drawings and detailed description thereto are not intended to limit the invention to the particular form disclosed, but on the contrary the invention is to cover all modifications, equivalents and alternatives falling within the spirit and scope of the present invention as defined by the appended claims.

DETAILED DESCRIPTION OF THE PREFERRED EMBODIMENTS

FIG. 2—Exemplary Application Architectures

Figure 2A:
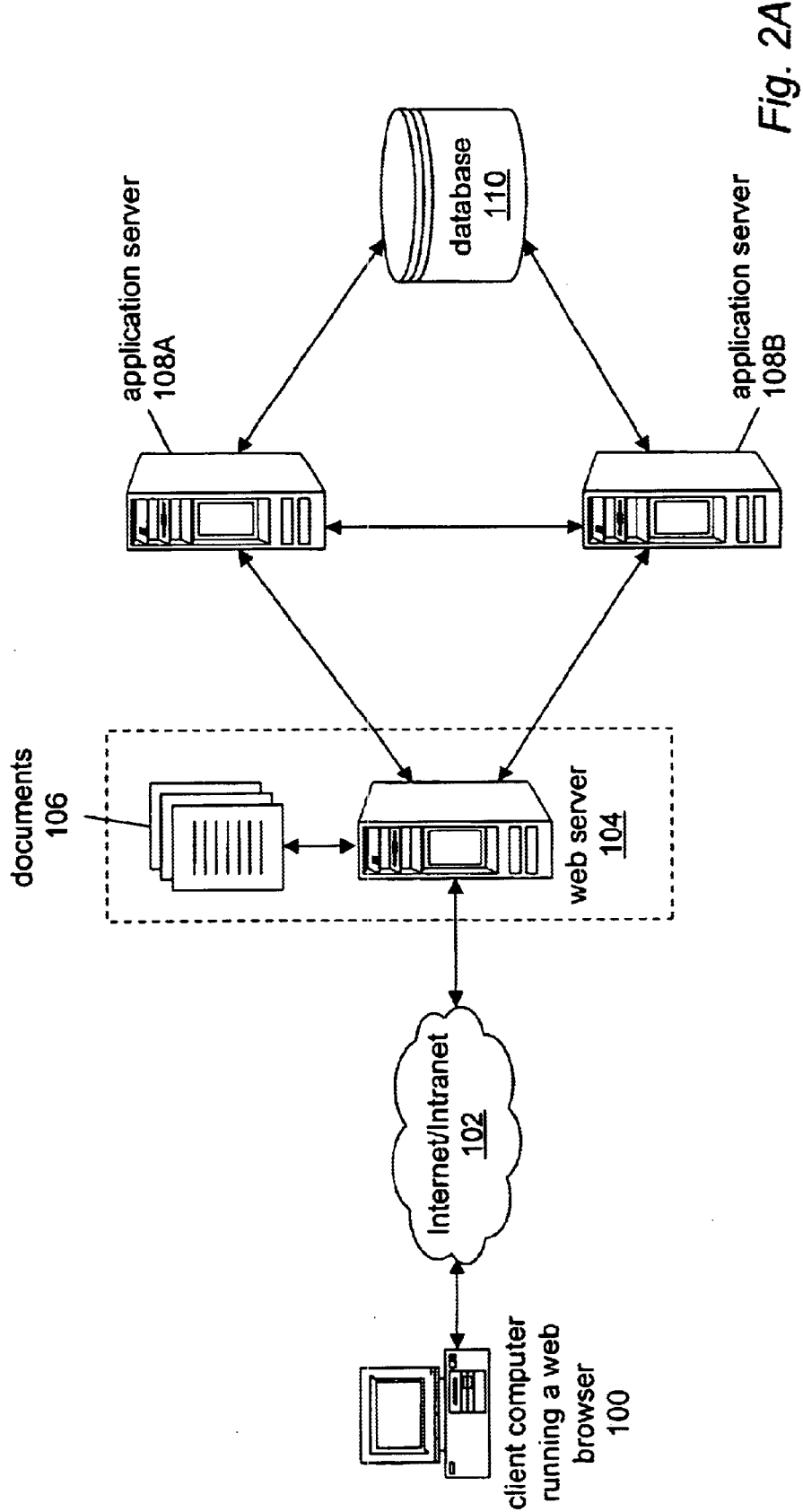
FIGS. 2A–2C illustrate exemplary architectures for networked applications running on application servers.
Figure 2B:
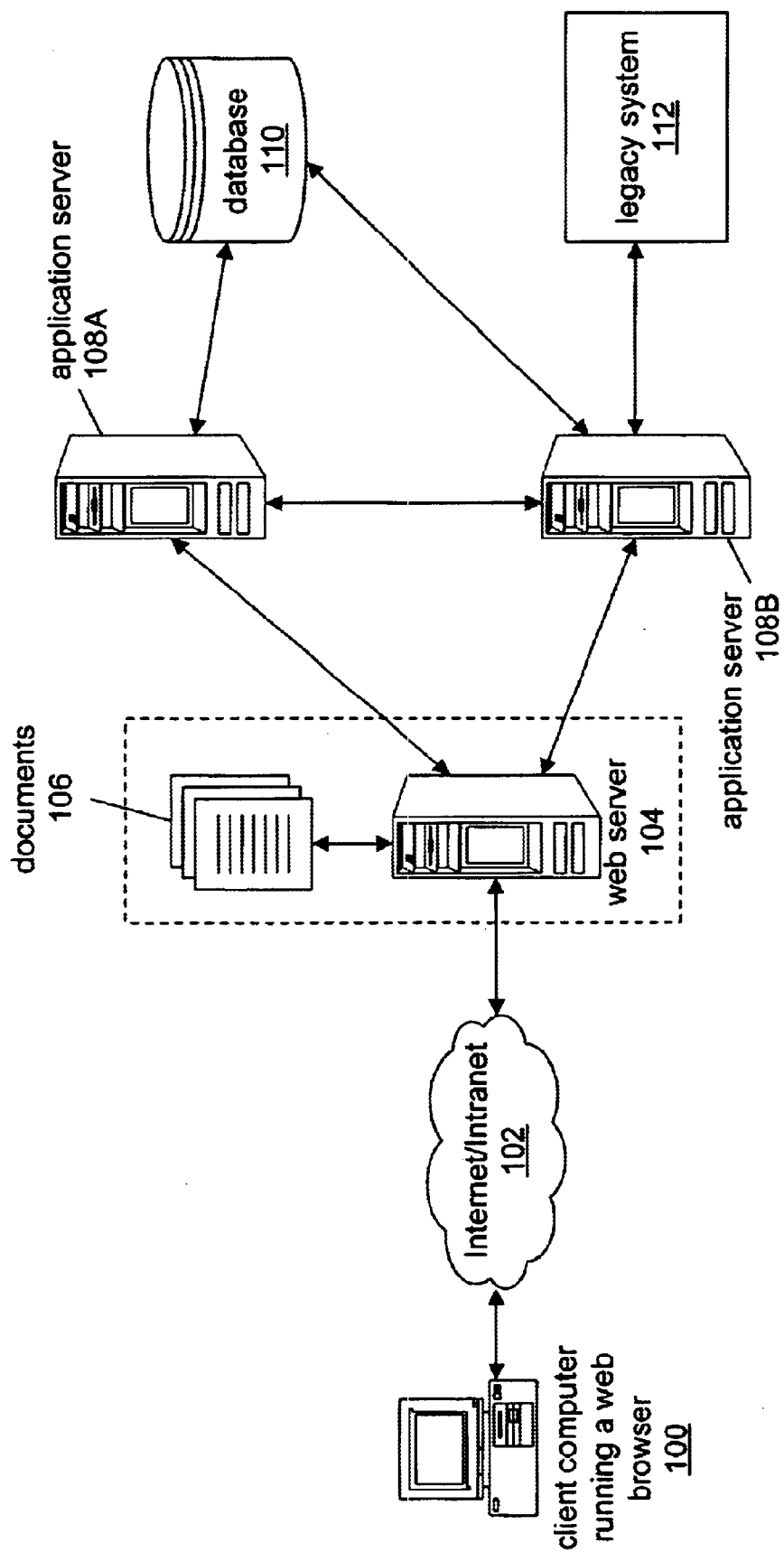
Figure 2C:
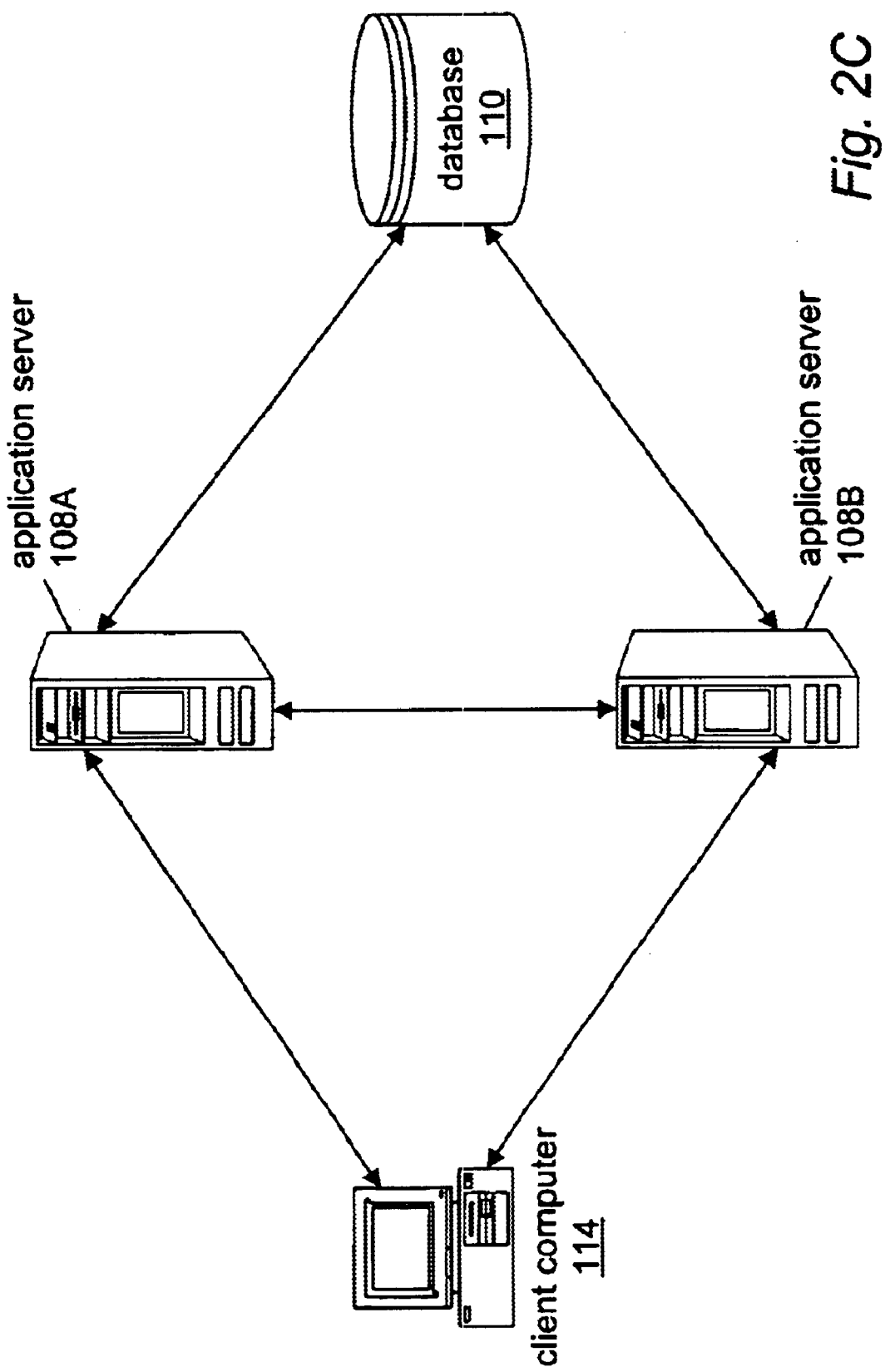

FIGS. 2A–2C illustrate exemplary architectures for networked applications running on application servers. There are, of course, many possible architectural variations, and FIGS. 2A–2C are exemplary only.

FIG. 2A illustrates an exemplary architecture for a web application. In general, a web application may be defined as an Internet or Intranet-based application comprising a collection of resources that are accessible through uniform resource locators (URLs). The resources may include web pages comprising HTML, XML, scripting code such as Javascript or VBScript, or other types of elements. The resources may also include any of various types of executable programs or components, such as CGI programs, Java servlets, JavaBeans components, CORBA components, downloadable code such as Java classes or ActiveX components, etc. The resources may also include any other type of resource addressable through a URL.

The embodiment of FIG. 2A illustrates a client computer 100 running a web browser, such as the Netscape Navigator or Microsoft Internet Explorer web browsers. It is noted that the web-browser need not be a web browser per se, but may be any of various types of client-side applications that include web-browsing functionality. For example, Microsoft Corp. provides programming interfaces enabling applications to incorporate various web-browsing capabilities provided by the Microsoft Internet Explorer code base.

The web browser may run in any type of client computer 100. For example, the web browser may run in a desktop computer or workstation running any of various operating systems, such as Windows, Mac OS, Unix, etc., or the web browser may run in a portable computing device, such as a personal data assistant, smart cellular phone, etc. The client computer 100 may use a network connection for communicating with a web server 104 via a network 102, such as the Internet or an Intranet. The client network connection may be a connection of any type, such as a PPP or SLIP dialup link, an Ethernet or token ring connection, an ISDN connection, a cable modem connection, any of various types of wireless connections, etc. Although web applications are often associated with particular communication protocols, such as HTTP or SSL, it is noted that any communication protocol, including TCP-based protocols and UDP-based protocols, may be used to communicate over the network 102.

As the web server 104 receives a request from a client computer 100, the web server may treat the request differently, depending on the type of resource the request references. For example, if the request references a document 106, such as an HTML document, then the web server may process the request itself, e.g., by retrieving the document from the web server's local file system or from a local cache and returning the document to the client computer. For other types of requests, e.g. requests referencing executable components, such as Java servlets, JavaBeans components, C program modules, CORBA components, etc., the web server may broker the request to an application server 108. As described in more detail below, the web server 104 may interface with an application server through an in-process extension, such as an ISAPI or NSAPI extension.

The application server 108 may be configured as a part of an application server cluster, as described above and shown in FIG. 2A. Although FIG. 2A illustrates an application server cluster with only two application servers, it is noted that the cluster may comprise any number of application servers. Each application server may interface with various types of other servers or systems. For example, as illustrated in FIG. 2A, the application servers may communicate with a database 110. Each application server in the cluster may interface with the same systems, or the application servers may differ in which systems they interface with. For example, FIG. 2B is similar to FIG. 2A, but in the embodiment of FIG. 2B, application server 108B is shown to interface with a legacy system 112. Application servers in a cluster may not need to be in close physical proximity to each other.

It is noted that, in alternative embodiments, a client computer may communicate directly with an application server or application server cluster, without interfacing through a web server. FIG. 2C illustrates a client computer 114 communicating directly with application servers 108. For example, the application servers may run an enterprise resource planning application, and the client computer 114 may be a computer within the enterprise that is connected to the application servers via a WAN. In this example, the client computer may run "thick client" software, e.g., client software that comprises a portion of the enterprise resource planning application logic. The client computer software may interface directly with executable programs or components running on the application servers, e.g. through a protocol such as the Internet Inter-Orb Protocol (IIOP).

As noted above, FIGS. 2A–2C are exemplary architectures only, and many variations are possible. As a small handful of examples of alternative embodiments, multiple web servers may be present to receive requests from client computers and broker the requests to application servers, the web server may itself interface directly with a database, application servers may interface with various other types of systems, such as specialized authentication servers, e-commerce servers, etc.

Figure 3:
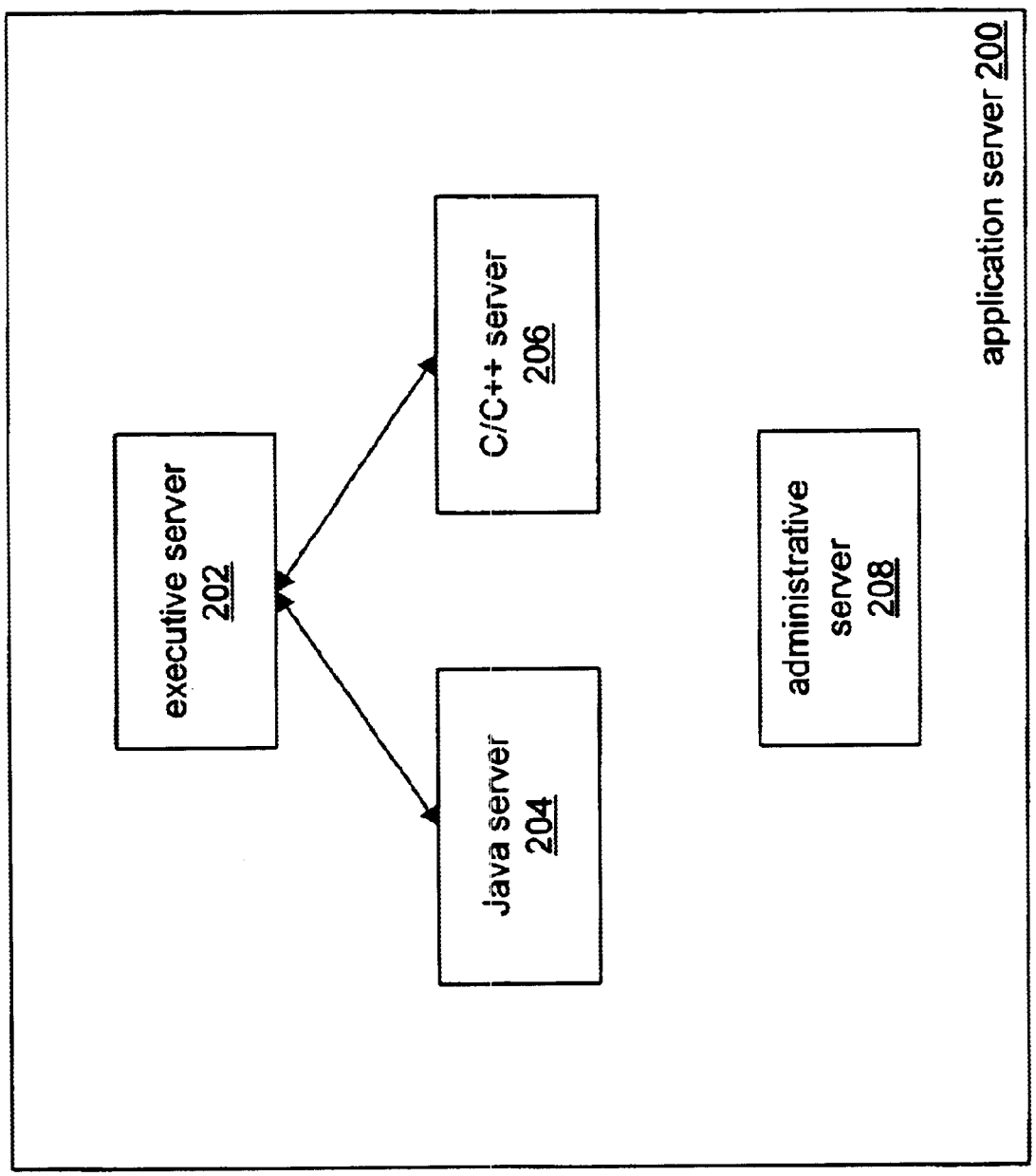
FIG. 3 is a block diagram illustrating one embodiment of an application server and processes that run on the application server.

FIG. 3—Service and Component Management

Applications that run on application servers are often constructed from various types of software components or modules. These components may include components constructed according to a standard component model. For example, an application may comprise various types of standard Java™ components such as Enterprise Java-Beans™ components, JavaServer Pages™, Java Servlets™, etc. An application may also comprise any of various other types of components, such as Common Object Request Broker Architecture (CORBA) components, Common Object Model (COM) components, or components constructed according to various proprietary component models.

Each request that an application server receives from a client may reference a particular application component. Upon receiving a request, the application server may determine the appropriate component, invoke the component, and return the execution results to the client. In various embodiments, it may be necessary or desirable for different types of application server components to run within different environments. For example, an application server may support both components written using the Java™ programming language and components written using the C or C++ programming languages. In such a case, the different types of components may be managed by particular processes or engines.

For example, FIG. 3 illustrates an application server 200 in which a process referred to as the "executive server" 202 runs. As shown, the executive server 202 interfaces with a process 204, referred to as a "Java server" and a process 206 referred to as a "C/C++ server". In this embodiment, the executive server 202 may receive client requests, assign the client requests to a particular thread, and forward the requests to either the Java server 204 or the C/C++ server 206, depending on whether the requests reference a component that executes within a Java runtime environment or a C/C++ runtime environment. The Java server or C/C++ server may then load and execute the appropriate component or module.

In addition to interfacing with the Java and C/C++ servers, the executive server 202 may also manage various system-level services. For example, as discussed below, the executive server may manage a load balancing service for distributing requests to other application server computers in a cluster, a request manager service for handling incoming requests, a protocol manager service for communicating with clients using various protocols, an event logging service for recording conditions or events, etc.

In addition to managing application components, the Java server 204 and the C/C++ server 206 may also host and manage various application-level services used by the application components. These application-level services may include services for managing access to databases and pooling database connections, services for performing state and session management, services for caching output results of particular application components, or any of various other services such as described above.

FIG. 3 also illustrates a process 208 referred to as the "administrative server". As described above, an application server environment may provide an administrative tool for adjusting various factors affecting application execution and performance. In the embodiment of FIG. 3, such an administrative tool may interface with the administrative server 208 to adjust these factors. For example, the administrative tool 208 may be enabled to adjust the event logging criteria used by the executive server's event-logging service, adjust the number of database connections pooled by the Java or C/C++ server's data access service, etc. The administrative server 208 may also provide failure recovery by monitoring the executive server, Java server, and C/C++ server processes and restarting these processes in case of failure.

FIG. 3 of course represents an exemplary architecture for managing application components, system-level services, and application-level services, and various other embodiments are contemplated. For example, although FIG. 3 is discussed in terms of Java™ and C/C++ components, various other processes or engines may be present for executing other types of software components or modules. Also, various embodiments may support multiple component management processes, e.g. multiple Java server processes or C/C++ server processes. The number of processes may be adjusted via an administrative tool interfacing with the administrative server.

Figure 4:
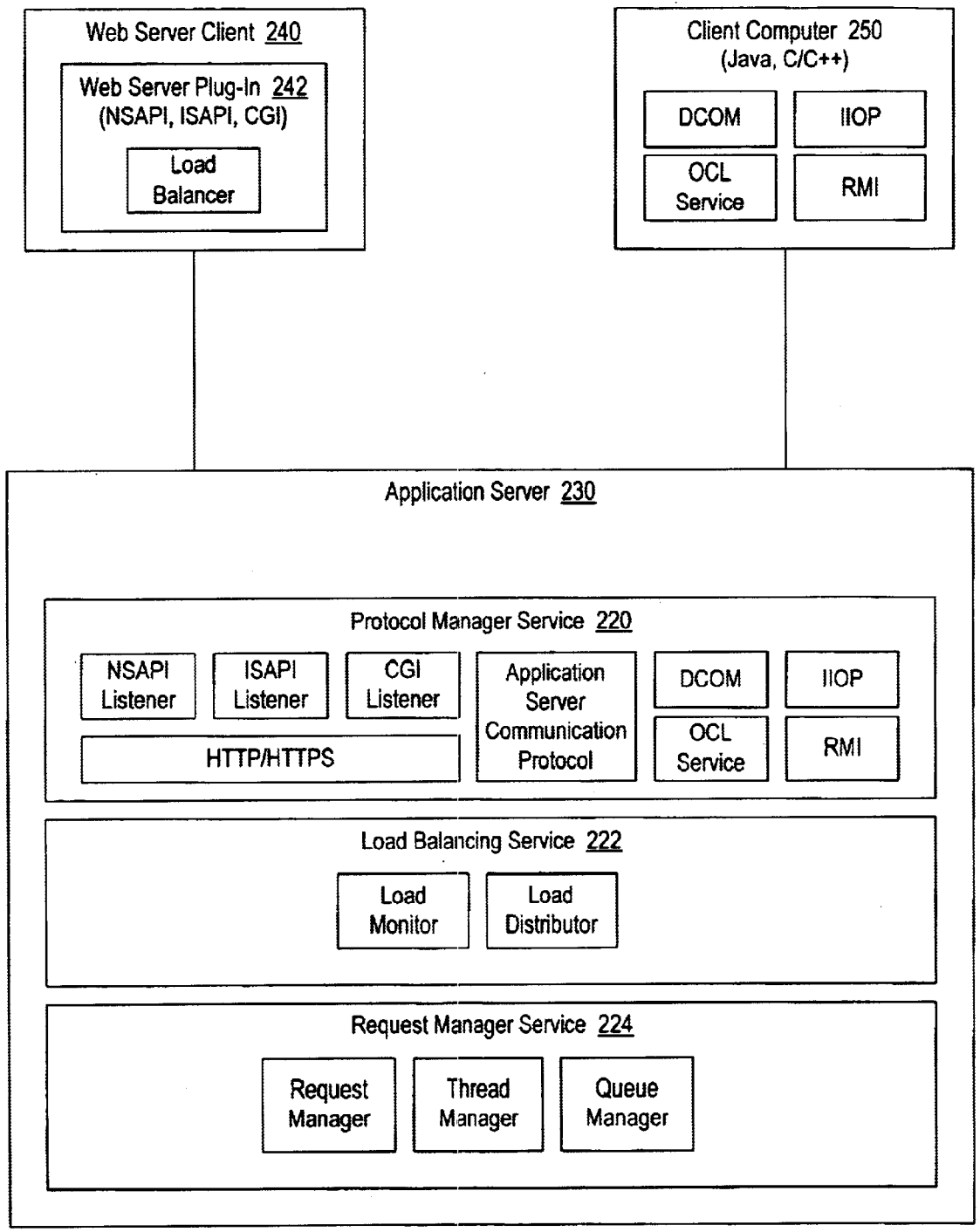
FIG. 4 illustrates several system-level services that may be involved in managing application server requests.

FIG. 4—Application Server System-Level Services

FIG. 4 illustrates several system-level services which may be involved in managing application server requests. In one embodiment, these system-level services may be managed by an executive server process such as described above with reference to the FIG. 3 application server.

FIG. 4 illustrates a protocol manager service 220. The protocol manager service 220 is responsible for managing network communication between the application server 230 and clients of the application server. For example, FIG. 4 illustrates a web server client 240 which comprises a standard web server extension or plug-in 242. The web server plug-in 242 may be any of various well-known types of plug-ins enabling web servers to communicate with other systems, including NSAPI, ISAPI, optimized CGI, etc. As shown, the protocol manager service 220 includes "listener" modules or components, e.g. an NSAPI listener, ISAPI listener, etc., for communicating with the web server plug-in. The listener modules may communicate with the web server plug-in via the standard HTTP or HTTPS protocols.

FIG. 4 also illustrates that other types of clients besides web servers may communicate with the application server 230. For example, a client computer 250 is shown. The client computer 250 may run an application program, such as a program written in Java™ or C++, that communicates with the application server 230 using any of various communication protocols. For example, as shown in FIG. 4, the protocol manager service 220 may support such protocols as IIOP, RMI, DCOM, OCL Service, or any of various other protocols. As an example, an administration program for configuring an application server may communicate directly with the application server 230 through such a protocol, rather than routing requests through a web server.

As shown in FIG. 4, an application server may also include a load balancing service 222. In the case of application server clustering, requests may first be processed by the load balancing service in order to determine whether the request should be processed by the current application server or would be better served by forwarding the request to another application server in the cluster. Load balancing is discussed in detail below.

As shown in FIG. 4, an application server may also include a request manager service 224. Once the load balancing service determines that the current application server should process the client request (if load balancing is applicable), the request manager service is responsible for managing the processing of the request. As shown in FIG. 4, the request manager service 224 may include several components or modules, such as a request manager, a thread manager, and a queue manager. In one embodiment, client requests may be processed in a multi-threaded fashion. The thread manager module may manage a pool of threads available for processing requests. In one embodiment, the number of threads in the pool may be adjusted using an administrative tool.

When the request manager module receives a client request, the request manger module may call the thread manager module to attempt to assign the client request to a thread. If no threads are currently available, then the request manager module may call the queue manager module to queue the request until a thread becomes available. The queue manager module may maintain information regarding each client request, such as the request ID, the processing status, etc.

Application Server Load Balancing

As discussed above, it is often desirable to configure a cluster of application servers so that client requests may be distributed across the cluster, i.e., to perform application server load balancing. Given the diverse nature of applications that may be deployed on application servers, it may be desirable to provide a system whose load balancing criteria are highly configurable using many different factors in order to achieve optimal application performance. This section discusses several load balancing methods. In various embodiments, application servers may support any of these load balancing methods or any combination of the load balancing methods described.

Load Balancing Determined by Web Server Plug-in

One general approach which may be used in selecting an application server to send a request to is to leave the decision to the client. The client may keep track of the response times seen over time from various application servers and may choose to send requests to the application server with the historically fastest response times. In many cases, the "client" of an application server is a web server. As shown in FIG. 4, a web server may have a web server plug-in which includes a load balancer component or module. This load balancer component may be responsible for monitoring which application servers are available in a cluster to service requests, may record the response times seen for requests serviced by each application server, and may use this information to determine the most appropriate application server to send a given request to.

The load balancer component of the web server plug-in may be configured, using an administrative tool, to use different levels of granularity in making the response time decisions. As discussed above, client requests generally reference a particular executable component on an application server. For example, a URL such as "http://server.domain.com/abc.jsp" may reference a JavaServer Page™ component, "abc.jsp". In an exemplary system in which the "abc.jsp" component is replicated across three application servers, Application Server A, Application Server B, and Application Server C, the average response time, as seen from the time the request referencing the "abc.jsp" component is sent to the application server to the time the request results are received from the application server, may be as follows:

| | |
|---|---|
| Application Server A: | 0.7 sec |
| Application Server B: | 0.5 sec |
| Application Server C: | 1.3 sec |

In such a case, it may be advantageous to enable the load balancer component of the web server to send a request referencing the "abc.jsp" component to Application Server B. In other words, load balancing may be performed on a "per-component" basis, where each request referencing a particular component is sent to the application server which has historically responded to requests for that component the fastest.

Performing load balancing on a per-component basis may benefit application performance for certain types of applications. However, for other applications, tracking such response-time information on a per-component basis may result in overhead that outweighs the benefits. Thus, the load balancer component of the web server may also make decisions on a "per-server" basis. That is, the determination of which application server to send requests to is based on the average response time for all requests. It is noted that in one embodiment the per-server and per-component methods may be combined, so that administrators may specify a particular set of components for which the load-balancing decisions are made based on a per-component basis, while decisions are made on a per-server basis for default components.

Figure 5:
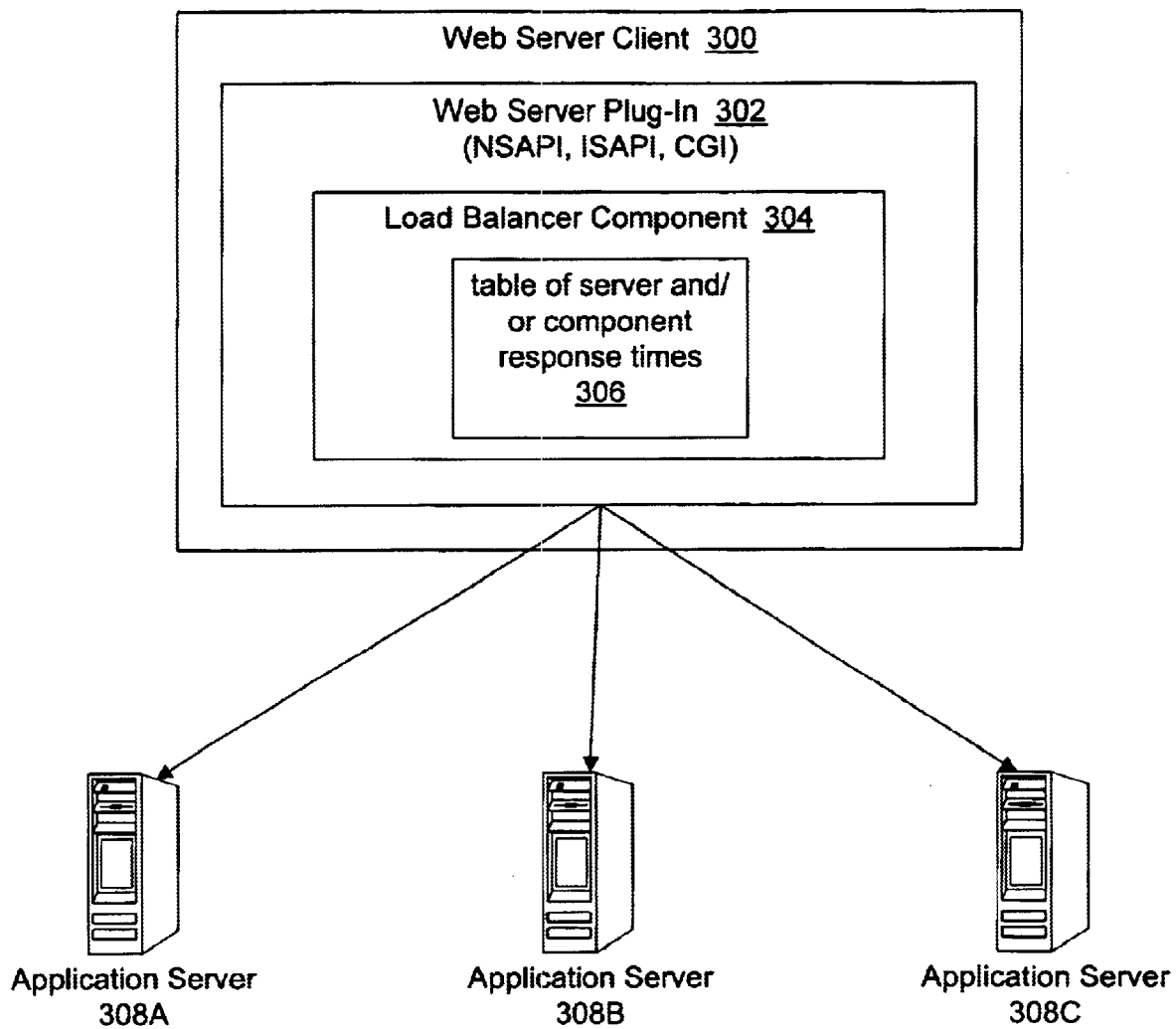
FIGS. 5 and 6 illustrate various embodiments of a web server client with a web server plug-in comprising a load balancer component that distributes requests across an application server cluster.

FIG. 5 illustrates one embodiment of a web server client 300 with a web server plug-in 302 comprising a load balancer component 304 which distributes requests across an application server cluster (application servers 308A–308C). As shown, the load balancer component 304 may maintain a table or list of response times 306, to be used in making load balancing decisions as described above.

The client, e.g., the load balancing component of the web server plug-in, may also make load balancing decisions based on factors other than response times. For example, in one embodiment, administrators may assign a "weight" to each application server in a cluster, using an administrative tool. A weight may be assigned to each application server based on the server's resources, such as the number of CPUs, the memory capacity, etc. The application server weights may then be used in various request distribution algorithms, such that requests are distributed among the application servers in proportion to their weights. For example, weights may be used in a weighted round-robin algorithm or may be applied to enforce even distribution for certain types of requests, as described below.

Figure 6:
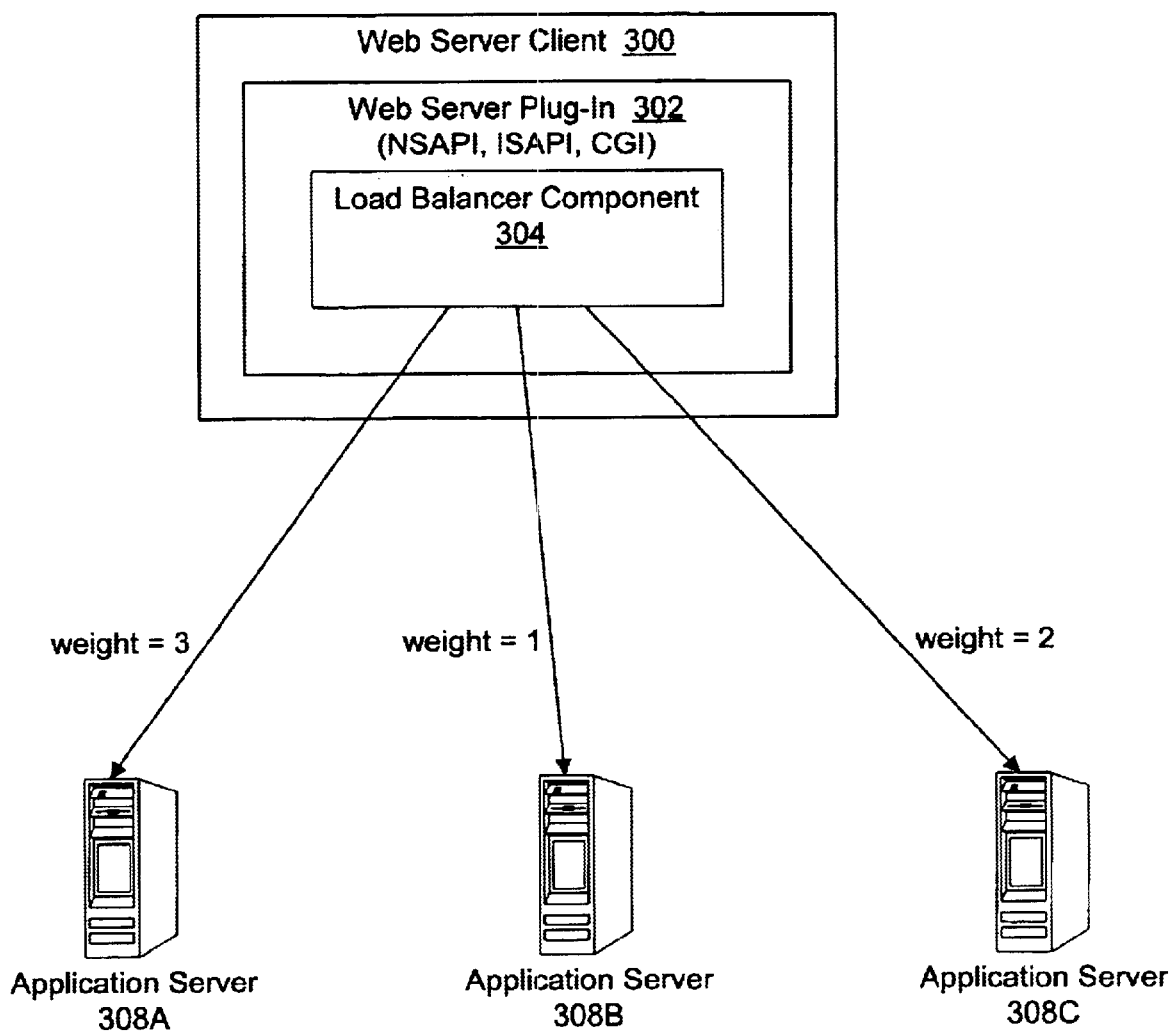

FIG. 6 illustrates one embodiment of a web server client 300 with a web server plug-in 302 comprising a load balancer component 304 which distributes requests across an application server cluster (application servers 308A–308C). As shown, a weight is assigned to each application server in the cluster, and the weights are used in a weighted load balancing algorithm.

Load Balancing Determined by Application Server Load Balancing Service

Figure 7:
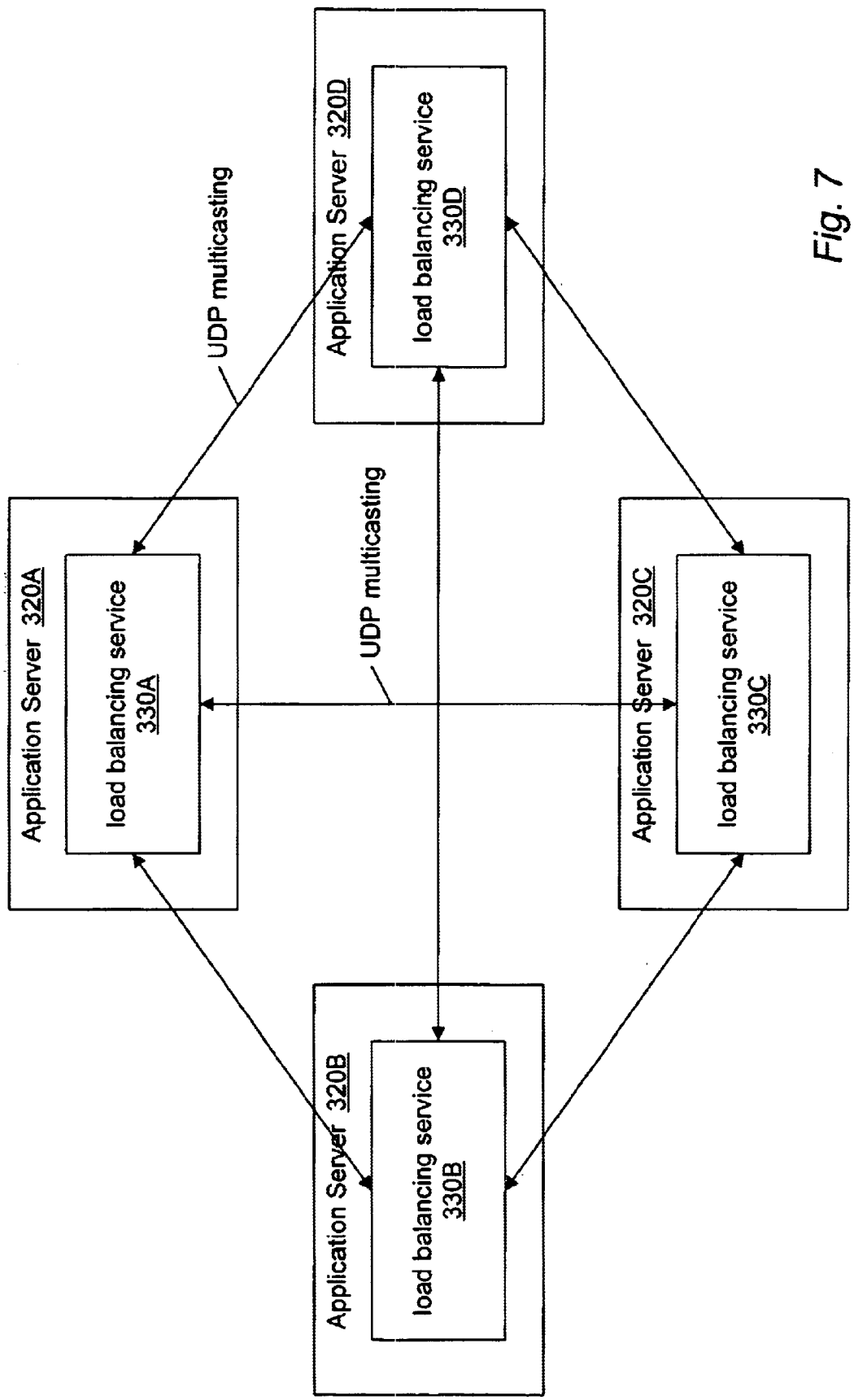
FIG. 7 illustrates a cluster of application servers in which each application server comprises a load balancing service.

Instead of leaving load balancing decisions to the client, based on such factors as response times and server weights, in various embodiments the application servers themselves may be responsible for distributing requests among different computers in the application server cluster. For example, in the FIG. 4 example, the application server 230 comprises a load balancing service 222 that performs request load balancing. FIG. 7 illustrates a cluster of application servers 320A–320D in which each application server comprises a load balancing service 330A–330D.

The load balancing services of the application servers may share information to be used in deciding which application server is best able to process a current request. One class of information that may be factored into this decision is referred to as "server load criteria." Server load criteria includes various types of information that may be indicative of how "busy" an application server currently is, such as the CPU load, the input/output rate, etc. FIG. 8 illustrates a table of exemplary server load criteria. Any of various other factors affecting server performance may be considered in other embodiments.

Another class of information that may be factored into load balancing decisions is referred to as "application component performance criteria". Application component performance criteria includes information regarding the performance of a particular application component, e.g. a particular JavaServer Pages™ component. FIG. 9 illustrates a table of exemplary criteria that may affect application component performance. For example, FIG. 9 illustrates a "Cached Results Available" criterion. As discussed below, in various embodiments, the execution results of application components, such as JavaServer Pages™ components, may be cached. Reusing execution results cached on a particular application server may result in faster processing of a request.

Another exemplary criterion listed in FIG. 9 is "Most Recently Executed". For some types of application components, distributing a request to the application server that most recently ran the application component referenced by the request may result in faster processing, since that application server may still have context information for the application component cached.

Another exemplary criterion listed in FIG. 9 is "Fewest Executions". In some cases, it may be desirable to distribute different types of requests evenly across all application servers in a cluster. Thus, the application server that has run the application component referenced by a request the fewest number of times may be chosen to process the request.

Any of various other factors regarding application component performance other than those listed in FIG. 9 may be used in other embodiments.

Figure 10:
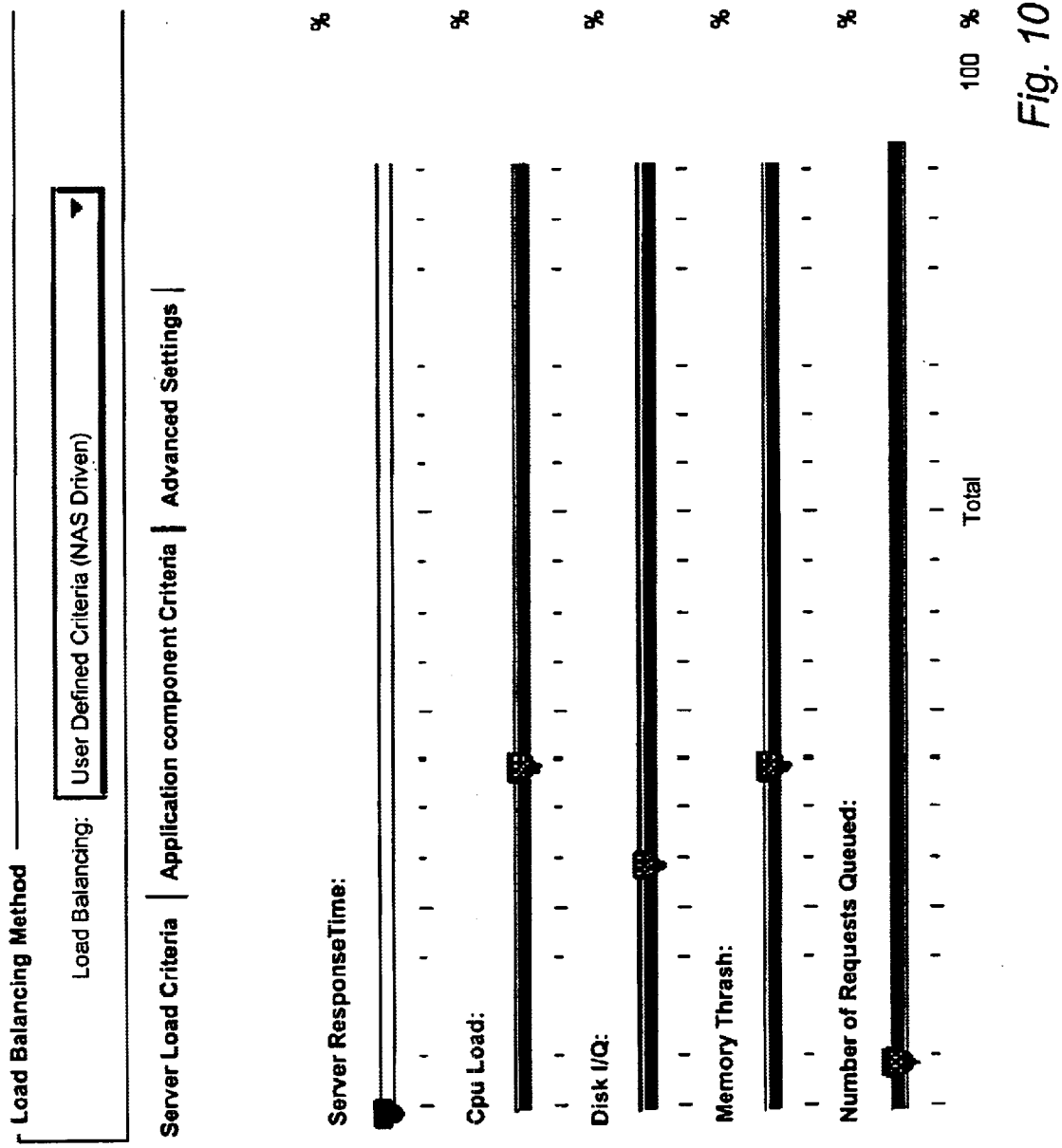
FIG. 10 illustrates an exemplary user interface screen for setting server load criteria values.
Figure 11:
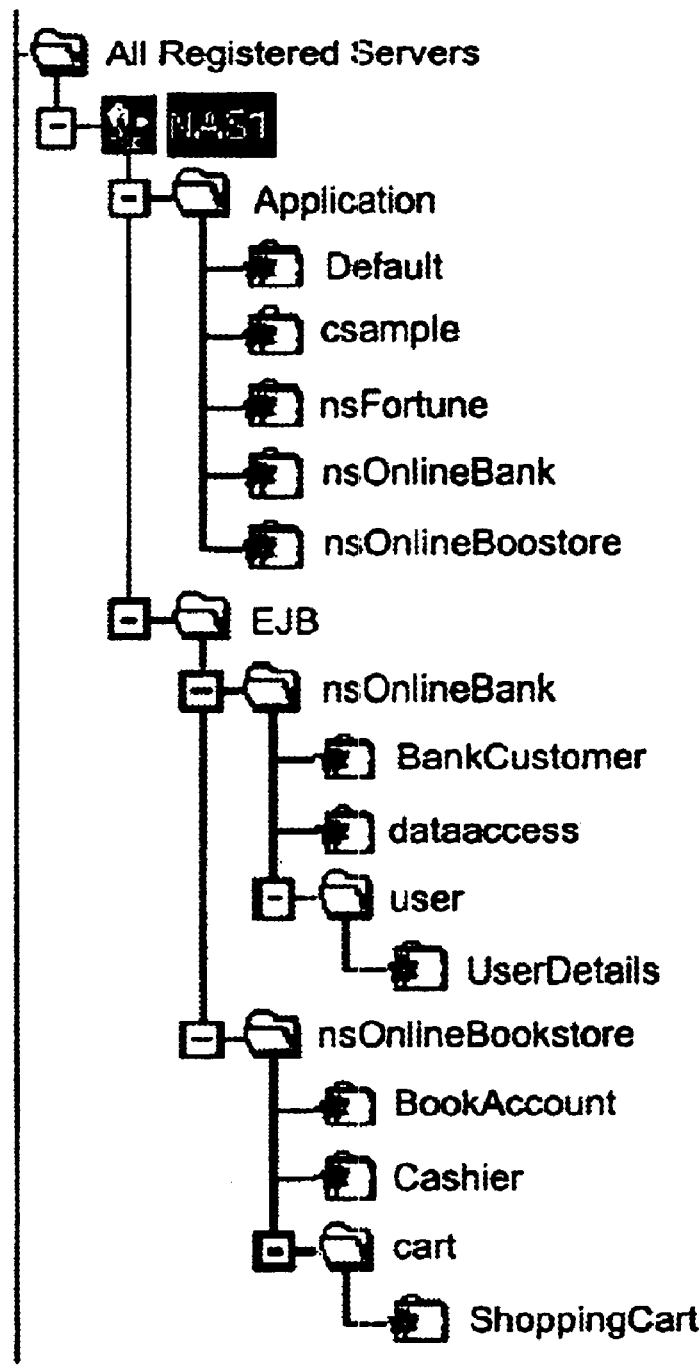
FIG. 11 illustrates a user interface partial tree view of application servers in an application server cluster.
Figure 12:
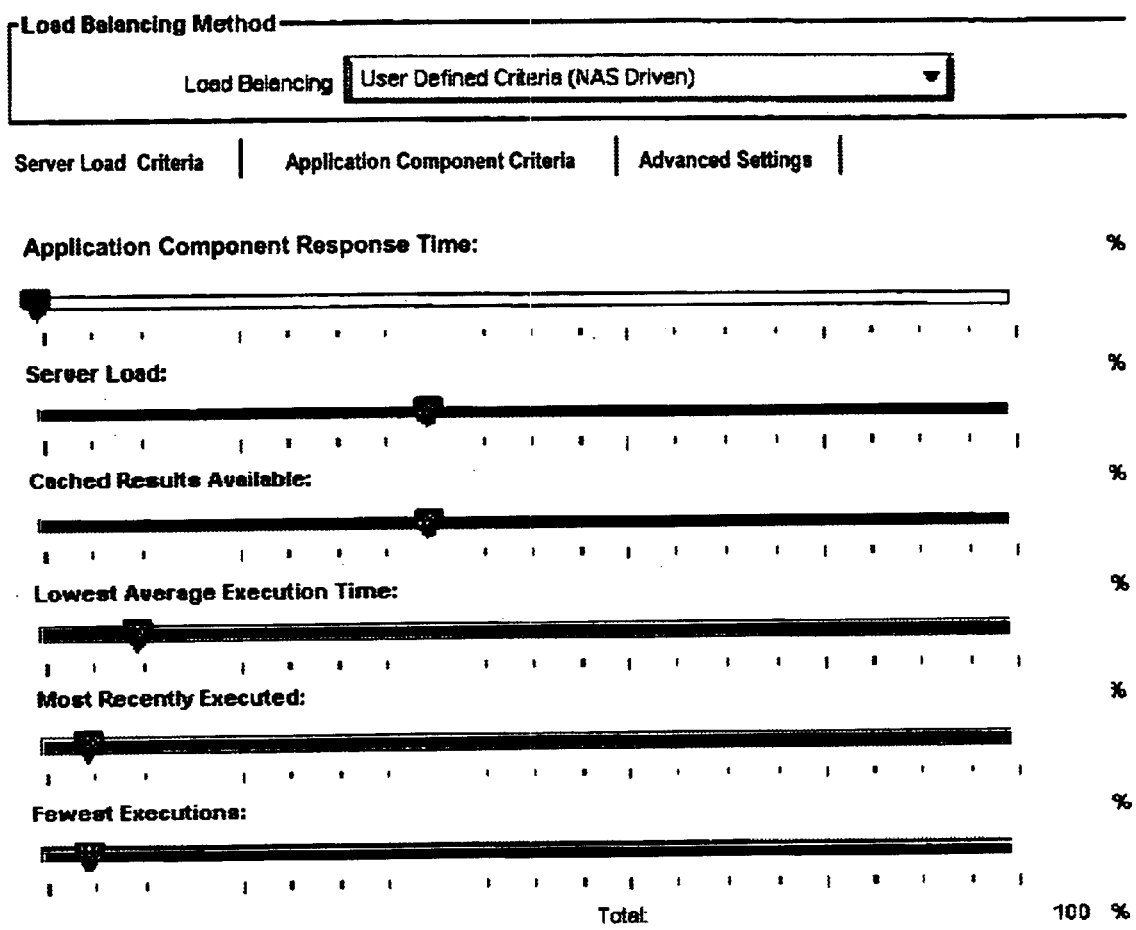
FIG. 12 illustrates an exemplary user interface screen for setting application component performance criteria values.

FIGS. 10–12 illustrate an exemplary user interface of an administrative tool for adjusting load balancing factors such as those described above. FIG. 10 illustrates a user interface screen for setting server load criteria values, such as those shown in the FIG. 8 table. Administrators may adjust the weight for each factor as appropriate, in order to maximize performance for a particular application server.

Note that the server load criteria values may be adjusted separately for each application server, as desired. FIG. 11 illustrates a partial tree view of application servers in an application server cluster. In FIG. 11, a single application server name, "NAS1", is shown, along with various application components that run on the "NAS1" application server. For example, in the embodiment shown, various Enterprise JavaBeans™ that run on the "NAS1" server are shown under the "EJB" heading. The screens shown in FIGS. 10 and 11 may be coupled so that the server load criteria settings adjusted on the FIG. 10 screen apply to the application server selected on the FIG. 11 screen.

FIG. 12 illustrates a user interface screen for setting application component performance criteria values, such as those shown in the FIG. 9 table. Administrators may adjust the weight given to each factor as appropriate, for each application component, by selecting the desired application component similarly as described above. The "server load" value shown in the FIG. 12 screen may be a composite value computed using the FIG. 10 server load criteria values. Thus, the load balancing criteria for each particular application component may be fine-tuned using a variety of factors, in order to achieve maximum performance for a particular system or application. The user interface may of course allow default load balancing criteria to be specified, may allow load balancing criteria for multiple application components or multiple servers to be specified or copied, etc.

Note that in FIGS. 10 and 12, "User-Defined Criteria" is selected in the "Load Balancing Method" field at the top of the screens, so that load balancing decisions are made by the application server load balancing services. The user interface may also allow the administrator to specify that load balancing decisions are made by the client, e.g., the web server plug-in, as described above with reference to FIGS. 5 and 6, by selecting a different option in this field.

Referring again to FIG. 7, the figure illustrates that the load balancing services 330 in each application server 320 may communicate with the load balancing services of other application servers in the cluster in order to share information, such as the server load criteria and application component performance criteria described above. In one embodiment, the load balancing services communicate using standard User Datagram Protocol (UDP) multicasting.

In one embodiment, intervals for both broadcasting and updating load balancing information may be set using an administrative tool. FIG. 13 illustrates one embodiment of a user interface screen for setting broadcast and update intervals. The "Base Broadcast/Update Interval" field refers to a base interval at which the load balancing service "wakes up" to broadcast information for its respective application server to the load balancing services of other application servers, to check to see whether any updated information was received from other load balancing services, and to update the load balancing information with any received updates. The other intervals shown in FIG. 13 are relative to the base broadcast/update interval. For example, the "Application Component Criteria" broadcast interval is two times the base interval, so that application component performance information is broadcast every other time the load balancing service wakes up. Note that performance information for a given application component may be exchanged only between application servers hosting that application component, in order to avoid unnecessary network traffic.

FIG. 13 also illustrates fields for setting the broadcast interval server load information, and the update intervals for information described above, such as the server load value, CPU load, Disk Input/Output, Memory Thrash, and Number of Requests Queued. By adjusting the various broadcast and update intervals appropriately for a given application or system, the optimum balance between fresh load balancing data, server update overhead, and network traffic may be achieved.

The information shared among application server load balancing services may be used to dynamically route a request received from a client to the "best" application server for processing the request. As discussed above, each client request may reference a particular application component. The decision as to which application server processes a request is preferably made based on the stored information regarding the particular application component. Thus, at any given time, the "best" application server for processing a request may depend on the particular application component that the request references, depending on how the server load criteria and application component performance criteria are chosen, as described above.

If the load balancing service of the application server that initially receives a request from a client determines that another application server is currently better able to process the request, then the request may be redirected to the other application server. As shown in the FIG. 13 user interface, administrators may specify a maximum number of "hops", i.e., the maximum number of times that a request may be redirected before it is processed by the application server that last received the request. The hop number may be updated in the request information each time the request is redirected. As the processed request is passed back to the client, e.g., the web server plug-in, the client may record the application server that ultimately satisfied the request, so that a similar future request would then be sent by the client directly to that application server.

"Sticky" Load Balancing

Administrators may mark certain application components for "sticky" load balancing, meaning that requests issued within the context of a particular session that reference that application component are all processed by the application component instance running on the same application server. Some application components may need to be marked for sticky load balancing, especially if the components rely on session information that cannot be distributed across application servers. Such situations may arise, for example, if an application is originally written to run on one computer and is then ported to a distributed application server cluster environment.

As an example of sticky load balancing, suppose that an application component called "ShopCart" is duplicated across two application servers, Server A and Server B, for load balancing. If a first client, Client 1 performs a request referencing the ShopCart component, then the ShopCart instance running on either Server A or Server B may be chosen to process the request, depending on the outcome of the load balancing decisions described above. Suppose that the Server A ShopCart instance processes the request. Then, if the ShopCart component is a component marked as requiring sticky load balancing, any further requests issued by Client 1 that reference the ShopCart component will also be processed by the Server A ShopCart component, regardless of the other load balancing criteria. Requests by other clients referencing the ShopCart component may of course be processed on other servers, e.g., on Server B, but then those requests too would "stick" to the application component instance where they were first processed.

FIG. 14 illustrates an exemplary user interface of a tool for enabling administrators to specify sticky load balancing for certain application components. FIG. 14 illustrates a group of application components which, for example, may be displayed by navigating through a hierarchy tree such as shown in FIG. 11. The "Sticky LB" column of the user interface has a checkbox allowing sticky load balancing to be turned on for particular application components.

Although some existing application server systems support sticky load balancing, the information required to determine the correct application server that should receive a given sticky request is often maintained on the server side. This may result in the client computer sending a sticky request to a first application server which then redirects the request to a second application server that should process the sticky request. To overcome this inefficiency, the client computer(s) may instead be operable to maintain information regarding sticky requests so that requests are sent directly to the correct application server.

In various embodiments, the application server system may also enforce even distribution of sticky requests. As noted, the initial request to a component requiring stickiness may be made using normal load balancing methods, such as those described above. At any given time, these load balancing methods may determine that a particular application server is the "best" server to process a request. Thus, it may be possible that a particular application server receives a large batch of initial requests referencing sticky components. Since each session that sent an initial sticky request to the application server is then bound to that application server for subsequent requests, the result may be a decrease in application performance over the long term.

Thus, the system may track information regarding the number of sticky requests that are currently bound to each application server and may force the sticky requests to be distributed roughly evenly. In one embodiment, administrators may assign a weight to each application server, such as described above, and the sticky requests may be distributed in proportion to these weights.

Graceful Distribution

Some existing application server load balancing systems use a "winner-take-all" strategy, in which all incoming requests at any given time are assigned to the calculated "best" application server. However, experience in the application server field has shown that the result of such a strategy may be cyclic pattern in which, at any given time, one application server may be under a heavy load, while other servers are mostly idle. This problem may arise in part from load balancing information being shared at periodic intervals, rather than in real time.

Thus, in various embodiments, "graceful" load balancing methods may be utilized, in which the "best" application server at a given time moment or interval, as defined by criteria such as described above, is assigned the largest number of incoming requests, while other application servers, or a subset of the other application servers, are still assigned some of the incoming requests. Such graceful load balancing may be performed using any of various methods. As a simple example, a weighted random distribution algorithm may be used. For example, for a cluster of application servers of size L, a random number between 1 and L may be generated, where the generated number designates the number of the application server to assign the request to, and where 1 represents the current "best" application server to process the request and L represents the application server at the other end of the spectrum. Thus, the random number is generated in a weighted manner, such that the probability of choosing a server number diminishes going from 1 to L. The resulting request distribution pattern may then appear similar to a y=1/x graph pattern.

This type of graceful request distribution may be applied at various levels, depending on a particular application or system. For example, as described above, one general load balancing approach that may be used is to leave the distribution decision to the client, e.g., by tracking the response times as seen from each application server. Thus the client, e.g., the web server plug-in, may rank the application servers by their response times and "gracefully" distribute requests among the application servers, thus helping to maintain an even work load among the application servers at all times. On the other hand, if load balancing decisions are made by the load balancing services of the application servers themselves, as described above, then these load balancing services may employ a type of graceful distribution algorithm.

Request Failover

As described above, requests may be brokered from a client such as a web server to an application server. In some instances, requests may fail, e.g., due to a lost connection between the client and the application server, an application server failure, etc. Depending on the communication protocol used to perform the request, requests may time out after a certain time period. For example, a TCP/IP-based request may timeout after a configurable time period. The timeout time period may or may not be configurable, depending on the environment, such as the particular operating system. Note that the typical default timeout period may be large, e.g. 30 minutes. If a request fails, e.g. due to a server power failure, other requests may be forced to wait while the requesting thread waits for a response that will never come.

Figure 15:
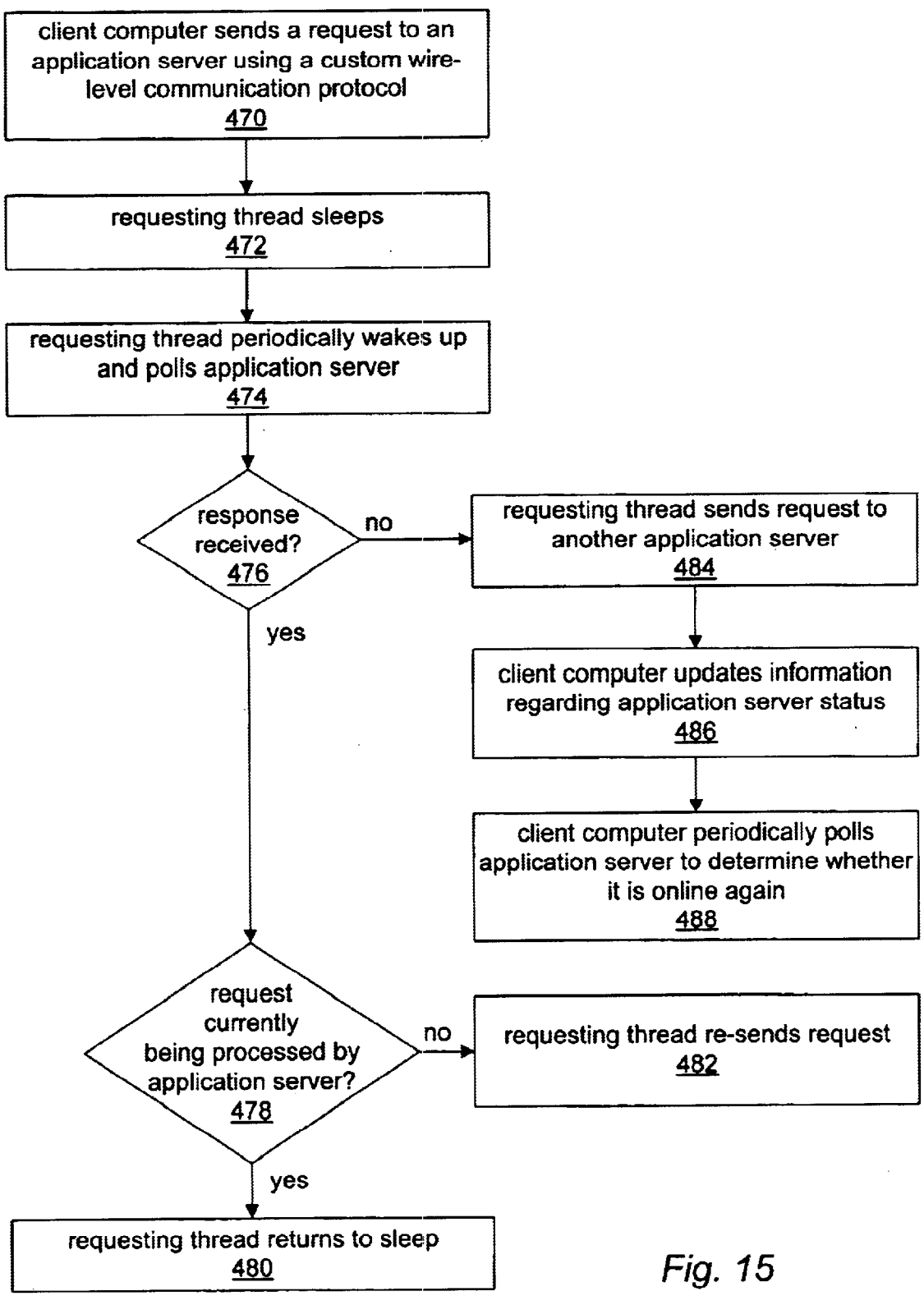
FIG. 15 is a flowchart diagram illustrating one embodiment of a method for enabling application server request failover.

FIG. 15 is a flowchart diagram illustrating one embodiment of a method that may overcome this problem. In step 470, the client computer sends a request to an application server using a custom wire-level communication protocol.

The use of such a protocol may enable the client computer to detect and recover from failed requests, as described below. Note that this custom protocol may be implemented as a protocol using various standard communication protocols, such as the TCP/IP protocol.

In one embodiment, each request is performed by a separate thread running in the client computer. In step 472, the requesting thread sleeps, using standard operating system techniques.

As shown in step 474, the requesting thread may periodically wake up to poll the application server for information regarding the status of the request. The time interval for which the requesting thread sleeps between performing these polling operations may be configurable by system administrators via a provided user interface. In one embodiment, the requesting thread may poll the application server by sending a User Datagram Protocol (UDP) message comprising information identifying the request to the application server. For example, each request sent to the application server may comprise a request ID enabling both the client computer and the application server to track the request. Upon receiving the UDP message, the application server is operable to use the request information to determine the status of the identified request and inform the requesting thread of the request status.

In step 476, the requesting thread determines whether a response to the poll message was received from the application server. For example, the requesting thread may simply wait for a response for a pre-set, relatively short time interval.

If a response to the poll message is received, then in step 478, the requesting thread analyzes the response to determine the current status of the request, as informed by the application server. If the request is currently being processed by the application server, then the requesting thread may simply return to sleep, as shown in step 480. Note to that this check can thus not only detect failed requests, but may also enable the application server to process requests that take a lot of time to process and that would result in request timeouts if standard communication protocols were used.

If the request is not currently being processed by the application server, then the request failed for some reason, e.g., due to a broken network connection, an application server error, etc. As shown in step 482, the requesting thread may then re-send the request and then re-perform steps 472–488. The requesting thread may be operable to attempt to send the request to the same application server a certain number of times before concluding that requests to that application server are failing for some reason and then attempting to send the request to a different application server, if the application server is part of an application server cluster.

If no response to the poll message was received in step 476, then in step 484, the requesting thread may send the request to another application server, if the application server is part of an application server cluster.

The client computer preferably maintains information regarding the current state of each application server in the cluster. In step 486, the application server that did not reply to the polling message may be marked as "offline" so that further requests will not be sent to that application server.

As shown in step 488, the client computer may be operable to periodically poll the failed application server to determine whether the application server is online again. For example, the client computer may run a thread that maintains the application server status information and periodically polls the application servers marked as being offline. If so, then the application server status information may be updated so that the application server is placed back in rotation to receive client requests.

Class Reloading

In various embodiments, an application server may allow some application components, such as Java Servlets™ and JavaServer Pages™, to be dynamically reloaded while the server is running. This enables administrators to make changes to an application without restarting. Having to stop/restart an application is, of course, a serious problem in many situations. As described below, administrators may specify which classes which are to be considered "versionable", or dynamically reloadable.

A versioning scheme is described with the following design points:

Not all classes are versioned by default. A distinction is made between "versionable" and "non-versionable" classes. As described above, versioning classes bydefault often suffers from various drawbacks.

Version all major components—If client's classes are "Known" (see definition below), then versioning will happen automatically.

User Configurable—For those client classes that are not "Known", the client may perform additional steps during deployment time to set up environmental variables. Users can then explicitly specify additional application-level classes that should be versionable.

Interfaces are preferably not versioned to avoid runtime conflicts that may be caused by dynamically updating interfaces.

The user may designate some classes as system classes. System classes preferably are not versioned. Certain classes may be designated as system classes by default.

Under the versioning scheme described herein, a user may control class versionability/reloadability by using the following environment entries, which may be implemented as registry entries. A user interface may be provided for managing these settings.

GX_ALL_VERSIONABLE

A non-zero value for this entry causes all classes to be considered versionable. The default value is zero. This entry may be used for backward compatibility with other systems.

GX_VERSIONABLE

This entry comprises a semicolon-delimited list of classes that are to be considered by the system as versionable classes. By default, the list is empty.

GX_VERSIONABLE_IF_EXTENDS

This entry comprises a semicolon-delimited list of classes. If a user's class extends a class in this list, then the user's class is considered to be versionable. The default class list contains the javax.servlet.GenereicServlet and javax.servlet.HttpServlet classes. Users can append additional classes to this list.

GX_VERSIONABLE_IF_IMPLEMENTS

This entry comprises a semicolon-delimited list of interfaces. If a class implements an interface in this list, then the class is considered to be versionable. The default interface list contains the javax.servlet.Servlet interface. Users can append additional interfaces to this list.

GX_TASKMANAGER_PERIOD

A timed thread wakes up periodically to check for any classes that may need to be reloaded. If a user modifies a versionable class, the thread may instantiate a new classloader to dynamically reload the modified class. The sleep time period for the thread may be set by setting the value of the GX_TASKMANAGER_PERIOD registry entry. The default value for the GX_TASKMANAGER_PERIOD entry is "10" seconds.

Known Classes

The class loader may determine whether a class that needs to be versioned is "known" based on its inheritance tree. The class loader checks for the class's super classes and implemented interfaces to determine whether they are in the GX_VERSIONABLE_IF_EXTENDS or GX_VERSIONABLE_IF_IMPLEMENTS lists, respectively. If there is a match, then the derived class is considered "known".

This system works particularly well in situations where all or most classes that need to be runtime-versioned are subclasses of a relatively small set of super classes. For example, in the case of servlets, all servlet classes that are versionable may be subclasses of the javax.servlet.GenericServlet or javax.servlet.HttpServlet, or they may all implement the javax.servlet.Servlet interface.

In one embodiment, JSP files are versionable by default. They can easily be identified not by their inheritance, but by their file name extension of *.jsp.

For any given class name that the classloader is asked to check, the classloader may locate the class file in the file system, then parse the classfile in order to identify its immediate superclass as well as all the interfaces implemented by the class. It is important to note that during the check, the class loader may only examine the classfile in the file system to determine versionability and may not actually load the class into the system in order to examine it. Due to the cache stickiness of the JVM concerning loaded classes, previous experiments have shown that it is usually a bad idea to load a class to determine the versionability of it. Thus the "normal" way to make one's class versionable is to extend/implement those classes specified in the above-mentioned registry entries.

Issuing a Warning While Serializing Non-versionable Classes

One potential problem occurs when an object that is being serialized in the session/state module refers to another object whose class is versionable. In order to detect potential errors downstream, the session/state code can be modified so that when a client session is being serialized, a sub-class of the stream class is instantiated. In this subclass an inquiry is made regarding each class that is being serialized. If such a class is determined to be "versionable" (as defined by the above-mentioned rules), the system may issue or log a warning. This detection method works with beans and servlets which implement the serializable interface.

Caching

Any cache within the system which may contain versionable classes (e.g., EJB container, servlets, JSPs) may provide an interface so that a class can be purged from the cache on a per-class basis, e.g., by specifying the name of the class to purge. Each component that pools versionable objects should provide a mechanism enabling the classloader to inform them that the class versions for those objects have changed, and that the pool should thus be purged. For example, an application server Java™ Servlet runner or Enterprise JavaBeans™ container may implement such interfaces.

Implementation Details

In one embodiment, there are three different class loaders working inside the system at any given time:

The Primordial Classloader (PCL)—used to load any core classes and any native code using "workaround" core classes Engine ClassLoader (ECL)—A classloader (more precisely a series of engineclassloaders) used to load all versionable classes Non Versionable Classloaders (NVCL)—A classloader used to load all non-versionable classes. There is only one such classloader, which is preferably never replaced.

A loadClass( ) call may first determine whether the class in question is versionable or not, and then use the appropriate classloader to load the class.

Figure 16:
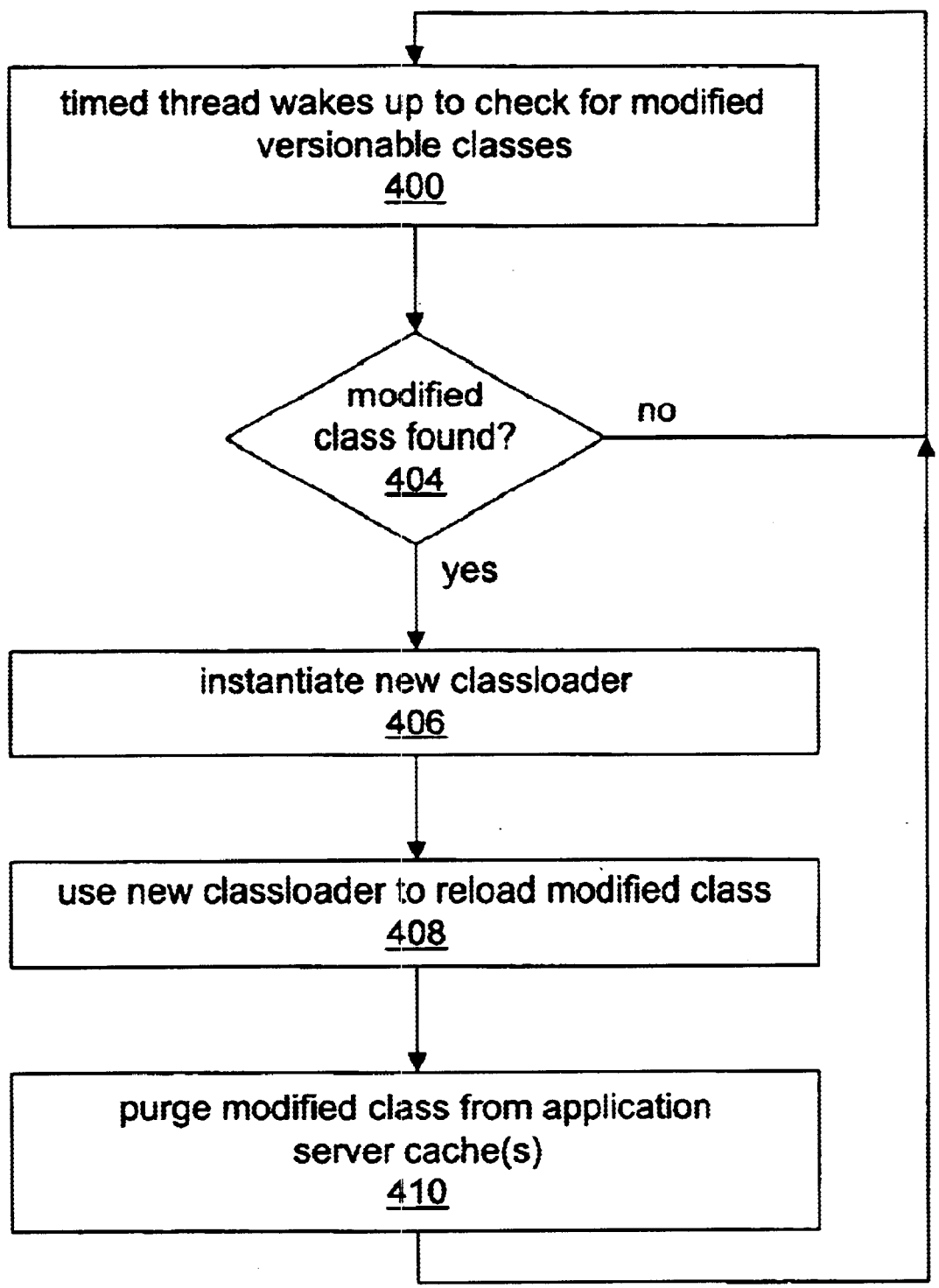
FIG. 16 is a flowchart diagram illustrating one embodiment of a method for dynamically discovering and reloading classes.
Figure 17:
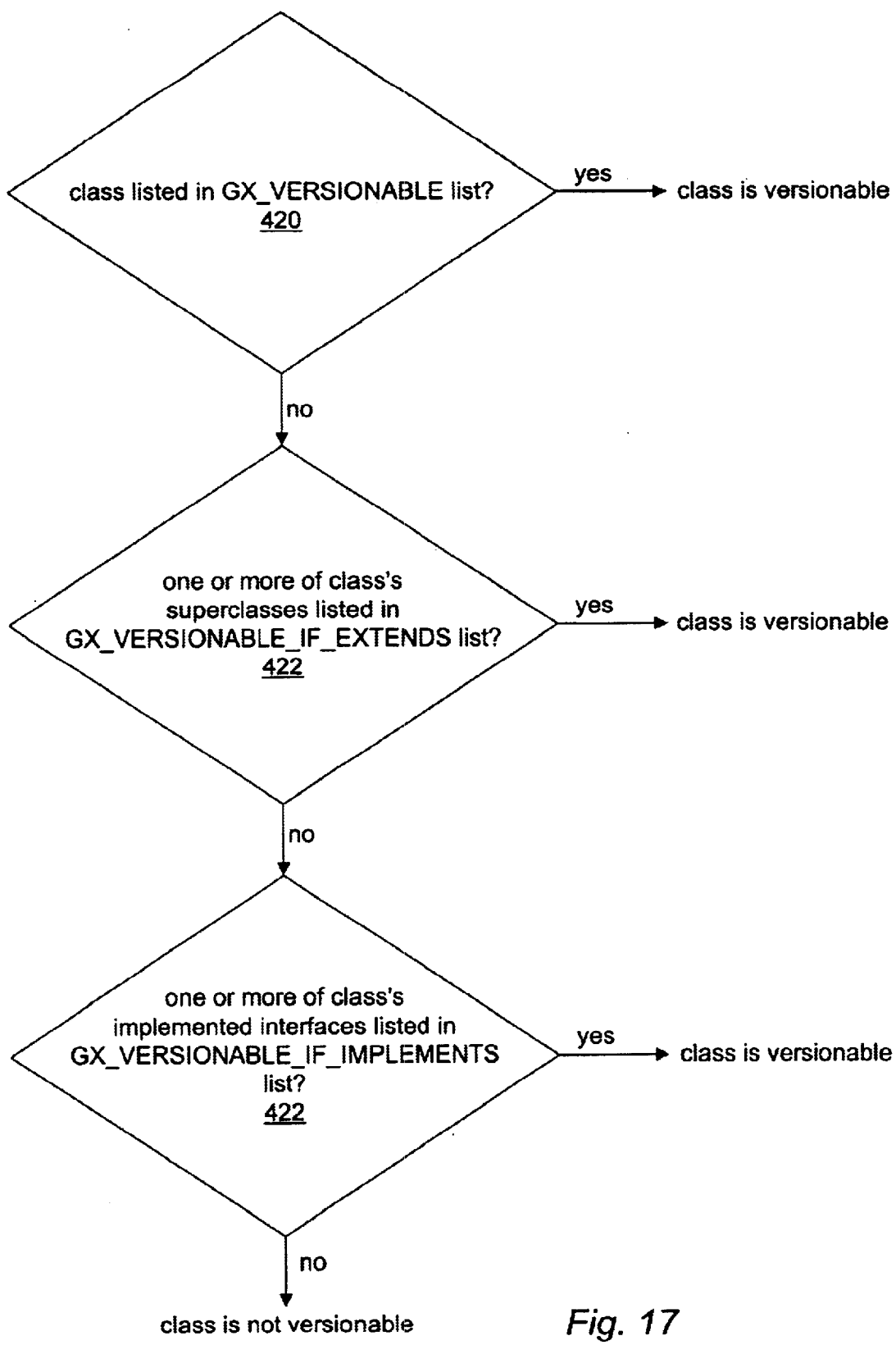
FIG. 17 is a flowchart diagram illustrating one embodiment of a method for determining whether a class should be dynamically reloaded when modified.

FIGS. 16–17: Versioning Flowcharts

FIG. 16 is a flowchart diagram illustrating one embodiment of a method for dynamically discovering and reloading classes, based on the descriptions above.

In step 400 of FIG. 16, a timed thread wakes up to check for modified classes. It is noted that it may only be necessary to check for changes in certain classes, since classes are not versioned by default. In one embodiment, the list of versionable classes may be determined once, e.g. using the method shown in the FIG. 17 flowchart, and the list may be reused by the timed thread each time the thread wakes up. If an administrator changes the versionability settings, the list may be updated. Each class in the list may be checked for modifications in any way appropriate for a particular environment. For example, the application server may record the date and time of the class file when the class is first loaded and may check to determine whether the file has since been modified.

As shown in step 404, if no modified versionable classes are found, the thread may simply return to sleep. If one or more modified classes are found, then steps 406–410 may be performed for each modified class.

In step 406, a new classloader is instantiated.

In step 408, the classloader instantiated in step 406 is used to reload the modified class.

In step 410, the modified class may be purged from any caches maintained by the application server. As described above, any application server components that maintain caches may provide interfaces for purging a modified class from the cache.

It is noted that FIG. 16 represents one embodiment of a method for dynamically reloading classes, and various steps may be added, omitted, combined, modified, reordered, etc. For example, in some environments it may not be necessary to instantiate a new classloader for each class to be reloaded.

FIG. 17 is a flowchart diagram illustrating one embodiment of a method for determining whether a class is versionable, that is whether the class should be dynamically reloaded when modified.

In step 420 of FIG. 17, it is determined whether the class name is listed in the GX_VERSIONABLE list (described above). If so, then the class is versionable.

In step 422, it is determined whether one or more of the class's superclasses are listed in the GX_VERSIONABLE_IF_EXTENDS list (described above). If so, then the class is versionable.

In step 424, it is determined whether one or more of the interfaces implemented by the class are listed in the GX_VERSIONABLE_IF_IMPLEMENTS list (described above). If so, then the class is versionable. Otherwise, the class may not be versionable. Modifications made to non-versionable classes may be ignored while an application is running.

It is noted that FIG. 17 represents one embodiment of a method for determining whether a class is versionable, and various steps may be added, omitted, combined, modified, reordered, etc. For example, steps 420–422 may be performed in any order desired.

It is noted that an application server utilizing the methods described above with reference to FIGS. 16 and 17 may advantageously not consider interface classes to be versionable by default, thus helping to enforce interface contracts between components.

Atomic Class-Loading

It is often desirable to update a set of classes atomically, i.e., to have all dynamic reloading changes for each class in the set take effect at the same time. Without an ability to perform atomic class-loading, errors may result when classes are dynamically reloaded.

Figure 18:
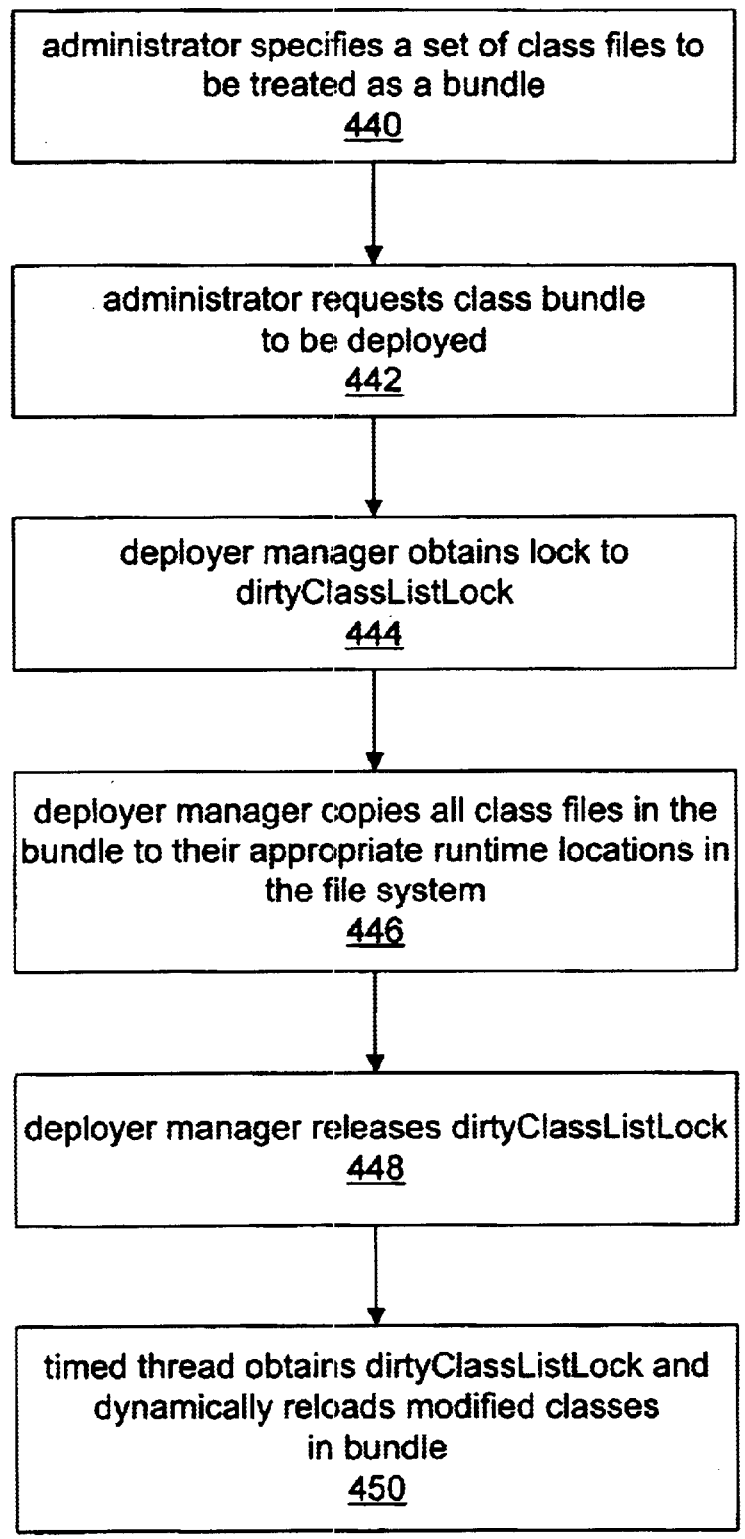
FIG. 18 is a flowchart diagram illustrating one embodiment of a method for performing atomic class-loading.

FIG. 18 is a flowchart diagram illustrating one embodiment of a method for performing atomic class-loading. As shown in step 440, an administrator may specify a set of class files to be treated as a "bundle". For example, the application server may provide a user interface for managing and deploying class files from a development environment to the runtime system. This user interface may enable the administrator to define or edit a class bundle. In one embodiment, a component referred to as the "deployer manager" provides these capabilities.

In step 442, the administrator requests the application server to deploy the class bundle specified in step 440, e.g., using the user interface described above.

In response to the administrator's request in step 442, the deployer manager may obtains a lock referred to as the "dirtyClassListLock" in step 444. The dirtyClassListLock may be implemented in any of various standard ways, e.g., as a semaphore. The timed thread described above that dynamically discovers and reloads modified versionable classes may also require the dirtyClassListLock. Thus, while the deployer manager holds the dirtyClassListLock, the timed thread may not proceed.

After obtaining the dirtyClassListLock, the deployer manager copies all class files in the bundle to their appropriate runtime locations in the file system in step 446.

The deployer manager then releases the dirtyClassListLock in step 448.

As shown in step 450, the timed thread can then resume its normal check for modified classes. Thus, all the new classes from the bundle are processed and loaded together.

JavaServer Pages™ Caching

This section provides an overview of JavaServer Pages™ (JSP) technology and describes a caching system and method for JSP component responses. JavaServer Pages™ (JSP) is a Java™ platform technology for building applications streaming dynamic content such as HTML, DHTML, XHTML and XML. JavaServer Pages is a Standard Extension that is defined on top of the Servlet Standard Extension. JSP 1.1 uses the classes from Java Servlet 2.1 specification. For more information on JavaServer Pages™, please refer to the JavaServer Pages™ Specification, Version 1.1, available from Sun Microsystems, Inc. For more information on Java servlets, please refer to the Java Servlet 2.1 Specification, available from Sun Microsystems, Inc.

A JSP component is a text-based document that describes how to process a request to create a response. The description intermixes template data with some dynamic actions and leverages on the Java™ Platform. In general, a JSP component uses some data sent to the server in a client request to interact with information already stored on the server, and then dynamically creates some content which is then sent back to the client. The content can be organized in some standard format, such as HTML, DHTML, XHTML, XML, etc., or in some ad-hoc structured text format, or not at all. The following segment illustrates a simple example of a JSP component:

```
<html>
<% if (Calendar.getInstance( ).get(Calendar.AM_PM)==
   Calendar.AM){%>
Good Morning
<%}else{%>
Good Afternoon
<%}%>
</html>
```

The example above shows a response page, which is intended to display either "Good Morning" or "Good afternoon" depending on the moment when the request is received. The page itself contains several fixed template text sections, and some JSP elements enclosed in "<%%>" brackets.

A JSP component may be handled in application servers by various types of JSP engines. For example, in one embodiment, the Java Server process 204 shown in FIG. 3 may manage or act as the JSP engine. The JSP engine delivers requests from a client to a JSP component and responses from the JSP component to the client. The semantic model underlying JSP components is that of a Servlet: a JSP component describes how to create a response object from a request object for a given protocol, possibly creating and/or using in the process some other objects.

All JSP engines must support HTTP as a protocol for requests and responses, but an engine may also support additional request/response protocols. The default request and response objects are of type HttpServletRequest and HttpServletResponse, respectively. A JSP component may also indicate how some events are to be handled. In JSP 1.1, only init and destroy events can be described: the first time a request is delivered to a JSP component a jspInit( ) method, if present, will be called to prepare the page. Similarly, a JSP engine can reclaim the resources used by a JSP component at any time that a request is not being serviced by the JSP component by invoking first its jspDestroy( ) method; this is the same life-cycle as that of Servlets.

JSP components are often implemented using a JSP translation phase that is done only once, followed by some request processing phase that is done once per request. The translation phase usually creates a class that implements the javax.servlet.Servlet interface. The translation of a JSP source page into a corresponding Java implementation class file by a JSP engine can occur at any time between initial deployment of the JSP component into the runtime environment of a JSP engine, and the receipt and processing of a client request for the target JSP component. A JSP component contains some declarations, some fixed template data, some (perhaps nested) action instances, and some scripting elements. When a request is delivered to a JSP component, all these pieces are used to create a response object that is then returned to the client. Usually, the most important part of this response object is the result stream.

A JSP component can create and/or access some Java objects when processing a request. The JSP specification indicates that some objects are created implicitly, perhaps as a result of a directive; other objects are created explicitly through actions; objects can also be created directly using scripting code, although this is less common. The created objects have a scope attribute defining where there is a reference to the object and when that reference is removed.

The created objects may also be visible directly to the scripting elements through some scripting-level variables (see Section 1.4.5, "Objects and Variables). Each action and declaration defines, as part of its semantics, what objects it defines, with what scope attribute, and whether they are available to the scripting elements. Objects are always created within some JSP component instance that is responding to some request object. JSP defines several scopes:

page—Objects with page scope are accessible only within the page where they are created. All references to such an object shall be released after the response is sent back to the client from the JSP component or the request is forwarded somewhere else. References to objects with page scope are stored in the pagecontext object request—Objects with request scope are accessible from pages processing the same request where they were created. All references to the object shall be released after the request is processed; in particular, if the request is forwarded to a resource in the same runtime, the object is still reachable. References to objects with request scope are stored in the request object.

session—Objects with session scope are accessible from pages processing requests that are in the same session as the one in which they were created. It is not legal to define an object with session scope from within a page that is not session-aware. All references to the object shall be released after the associated session ends. References to objects with session scope are stored in the session object associated with the page activation.

application—Objects with application scope are accessible from pages processing requests that are in the same application as they one in which they were created. All references to the object shall be released when the runtime environment reclaims the ServletContext. Objects with application scope can be defined (and reached) from pages that are not session-aware. References to objects with application scope are stored in the application object associated with a page activation. A name should refer to a unique object at all points in the execution, i.e. all the different scopes really should behave as a single name space. A JSP implementation may or not enforce this rule explicitly due to performance reasons.

Fixed Template Data

Fixed template data is used to describe those pieces that are to be used verbatim either in the response or as input to JSP actions. For example, if the JSP component is creating a presentation in HTML of a list of, say, books that match some search conditions, the template data may include things like the <ul>, </ul>, and something like <li>The following book . . . .

This fixed template data is written (in lexical order) unchanged onto the output stream (referenced by the implicit out variable) of the response to the requesting client.

Directives and Actions

JSP elements can be directives or actions. Directives provide global information that is conceptually valid independent of any specific request received by the JSP component. For example, a directive can be used to indicate the scripting language to use in a JSP component. Actions may, and often will, depend on the details of the specific request received by the JSP component. If a JSP is implemented using a compiler or translator, the directives can be seen as providing information for the compilation/translation phase, while actions are information for the subsequent request processing phase. An action may create some objects and may make them available to the scripting elements through some scripting-specific variables.

Directive elements have a syntax of the form
<%@ directive . . . %>
There is also an alternative syntax that follows the XML syntax.

Action elements follow the syntax of XML elements, i.e. have a start tag, a body and an end tag:
<mytag attr1="attribute value" . . . >
body
</mytag>
or an empty tag
<mytab attr1="attribute value" . . . />
A JSP element has an element type describing its tag name, its valid attributes and its semantics; we refer to the type by its tag name.

Applications and ServletContexts

In JSP 1.1 (and Servlet 2.1) an HTTP protocol application is identified by a set of (possibly disjoint) URLs mapped to the resources therein. JSP 1.1 does not include a mechanism to indicate that a given URL denotes a JSP component, although every JSP implementation will likely have such mechanism. For example, JSPs may be identified by a "jsp" file extension. In most JSP implementations, a JSP component is transparently translated into a Servlet class file through a process involving a Java™ compiler.

The URL set described above is associated, by the JSP engine (or Servlet runtime environment) with a unique instance of a javax.servlet.ServletContext. Servlets and JSPs in the same application can share this instance, and they can share global application state by sharing objects via the ServletContext setAttribute( ), getAttribute( ) and removeAttribute( ) methods. We assume that the information that a JSP component uses directly is all accessible from its corresponding ServletContext.

Each client (connection) may be assigned a session (javax.servlet.http.HttpSession) uniquely identifying it. Servlets and JSPs in the same "application" may share global session dependent state by sharing objects via the HttpSession putValue( ), getValue( ) and removeValue( ) methods. Care must be taken when sharing/manipulating such state between JSPs and/or Servlets since two or more threads of execution may be simultaneously active within Servlets and/or JSPs, thus proper synchronization of access to such shared state is required at all times to avoid unpredictable behaviors. Note that sessions may be invalidated or expire at any time. JSPs and Servlets handling the same javax.servlet.ServletRequest may pass shared state using the ServletRequest setAttribute( ), getAttribute( ) and removeAttribute( ) methods.

Translation Phase

A typical implementation works by associating with the URL denoting the JSP a JSPEngineServlet. This JSPEngineServlet is responsible for determining if there already exists a JSP component implementation class; if not it will create a Servlet source description implementing the JSP component, compile it into some bytecodes and then load them via a ClassLoader instance; most likely never touching the file system. Once the JSP component implementation class is located, the JSPEngineServlet will perform the usual Servlet initialization and will deliver the request it received to the instance. The JSPEngineServlet Servlet is instantiated in a ServletContext that represents the original JSP object.

JSP Response Caching

This section describes how response caching may be enabled for a system implementing JSP technology. Although one use of JSP is to create dynamic responses, such as dynamic web pages for display, it will be appreciated that response caching may be desirable in many situations. For example, data used to create a response may change only once an hour, and thus a response created from the data could be cached and reused much of the time. In particular, caching may often improve the performance of running composite JSPs, that is JSP files which include other JSPs.

For each JSP component, the criteria for reusing a cached version of the response may be set in any of various ways. For example, the caching criteria may be set by processing tags included in the JSP file, as illustrated by the following example:

```
<%@ taglib prefix="ias"uri="CacheLib.tld"%>
<ias:cache>
<ias:criteria timeout="30">
<ias:check class=
   "com.netscape.server.servlet.test.Checker"/>
<ias:param name="y"value="*"scope="request"/>
</ias:criteria>
</ias:cache>
<%!int1=0; %>
<html>
<body>
<h2>Hello there</h2>
I should be cached.
No?<b><%=i++%></b>
</body>
</html>
``` where Checker is defined as a class such as the following example:

```
package com.netscape.server.servlet.test;
import com.netscape.server.*;
import javax.servlet.*;
import javax.servlet.http.*;
public class Checker{
   String chk="FOO";
   public Checker( )
   {
   }
   public Boolean check (ServletRequest_req, Servlet
      servlet)
      HttpServletRequest req=(HttpServletRequest) _req;
      String par=req.getParameter("x");
      return new Boolean(par==null ?false: par.equals(chk));
   }
}
```

Alternatively to using tags to set the caching criteria, a method call may be included in the JSP component, such as a "setCacheCriteria( )" method. If a method call is used to set caching criteria, the setCacheCriteria( ) method may be overloaded to allow for various arguments to be passed in. For example, in one embodiment the setCacheCriteria( ) method comprises the following signature variants:

setCacheCriteria(int secs)
where the 'secs' parameter indicates the number of seconds for which the cached response should be considered valid. In this variant, no other criteria are specified. Thus, the JSP response is unconditionally cached. If 'secs' is set to 0, the cache may be flushed.
setCacheCriteria(int secs, String criteria)
where the 'secs' parameter is the same as described above, and the 'criteria' parameter specifies the criteria to use in determining whether or not the cached response may be used to satisfy a request. Caching criteria are discussed in more detail below.

Caching Criteria

The interface for calling JSPs is based on the interface javax.servlet.RequestDispatcher. This interface has two methods, forward( ) and include( ), where the former acts like a redirect, i.e. it can be called only once per request, whereas the latter can be called multiple times. For example, a forward call to 'f.jsp' may look like:

```
public void service(HttpServletRequest req, HttpServletResponse res)
   throws ServletException, IOException
{
   res.setContentType ("text/html");
   RequestDispatcher dispatcher=
      getServletContext( ).getRequestDispatcher("f.jsp");
   dispatcher.forward(req, res);
}
```

JSP components often accept and use arguments themselves. Arguments to the JSP file can be passed as part of the URL of the file, or in attributes using ServletRequest.setAttribute ( ). These argument names and values can be used to set caching criteria and to check whether a cached response can be used to satisfy a request.

For example, in an include call to 'f.jsp', arguments 'age' and 'occupation' can be passed as:

```
public void service(HttpServletRequest req, HttpServletResponse res)
   throws ServletException, IOException
{
   res.setContentType("text/html");
   RequestDispatcher dispatcher=
      getServletContext( ).getRequestDispatcher
         ("f.jsp?age=42");
   req.setAttribute("occupation", "doctor");
   dispatcher.include(req, res);
```

Within the f.jsp component, a setCacheCriteria( ) statement may then set the response caching criteria based on the values of the 'age' and 'occupation' arguments. For example, the f.jsp component may include the statement:
<% setCacheCriteria (3600, "age>40 & occupation= doctor"); %>to indicate that the response should be cached with an expiration time of 3600 seconds, and that the response may be used to satisfy any requests to run the f.jsp component with an 'age' argument value of greater than 40 and an 'occupation' argument value of "doctor". Of course, the JSP component may contain numerous setCacheCriteria( ) statements at different points in the JSP file, e.g. at different branches within an 'if' statement, each of which may set different caching criteria. Depending on the arguments passed in to the JSP and other dynamic conditions, a particular set of caching criteria may then be set for the response currently being generated.

In the example above, the dispatcher may use the values of the 'age' and 'occupation' arguments to determine whether any cached JSP responses can be used to satisfy a request instead of re-running the JSP and re-generating a response from it. For example, a request to f.jsp appearing as:

res.setContentType("text/html");
    RequestDispatcher dispatcher=
    getServletContext( ).getRequestDispatcher("f.jsp?age= 39 & occupation=doctor");
    dispatcher.forward(req, res);

would not be satisfied by a response previously generated from the f.jsp JSP which had set its caching criteria with the statement:

<% setCacheCriteria (3600, "age>40 & occupation= doctor"); %> because the age argument is not within the range specified as valid for this cached response. However, this same request may be satisfied by a response previously generated from the f.jsp JSP which had set its caching criteria with the statement:

<% setCacheCriteria (3600, "age>35 & occupation= doctor"); %>

Hence the cache may be checked before running a JSP, and if a valid cached response is found, then the dispatcher may return the response immediately.

A cached JSP response may be stored in various ways. In one embodiment, a response is stored as a byte array (byte[ ] in Java). Each cached response may have an associated criteria set stored, indicating when the response is valid. The criteria may include an expiration time, e.g. a time in seconds to consider the cached response valid. After this expiration time passes, the response may be removed from the cache. The criteria may also include a set of constraints, where each constraint specifies a variable and indicates the valid values which the variable value must match in order to satisfy the cache criteria. As described above, a JSP response may set these cache criteria programmatically using a setCacheCriteria( ) statement or using tags. For example, the SetCacheCriteria (3600, "age>35 & occupation=doctor") statement appearing above specifies an expiration time of 3600 seconds and a constraint set with two constraints:

'age'>35 and
'occupation'="doctor"

In various embodiments, different types of constraints may be specified, including the following types of constraints:

x (e.g., SetCacheCriteria (3600, "x"))

meaning that 'x' must be present either as a parameter or an attribute.

x=v1|v2| . . . |vk (e.g., SetCacheCriteria (3600, "x=doctor|nurse"))

meaning that 'x' must match one of the strings listed. For each string, a regular expression may be used, where 'x' is said to match the string if it meets the regular expression criteria given. If x=* is used, then the constraint is true of the current request if the request parameter for x has the same value as was used to store the cached buffer.

x=low–high (e.g., SetCacheCriteria (3600, "x=20–50"))

meaning that 'x' must match a value in the range of low <=x<=high.

class="x.y.z" (e.g., as shown above in the JSP file example) meaning that the Java class 'x.y.z' implements a method "check (HttpServletRequest req)" which returns true when the request obeys the constraints imposed by the method. Various other types of constraints may also be specified, such as the use of mathematical "greater than/less than" symbols, etc. for ensuring that an argument falls within a certain range. Also, constraints may be specified based on dynamic user session data, such as the current value of a user's shopping cart, user demographic information, etc.

FIG. 19—Flowchart

Figure 19:
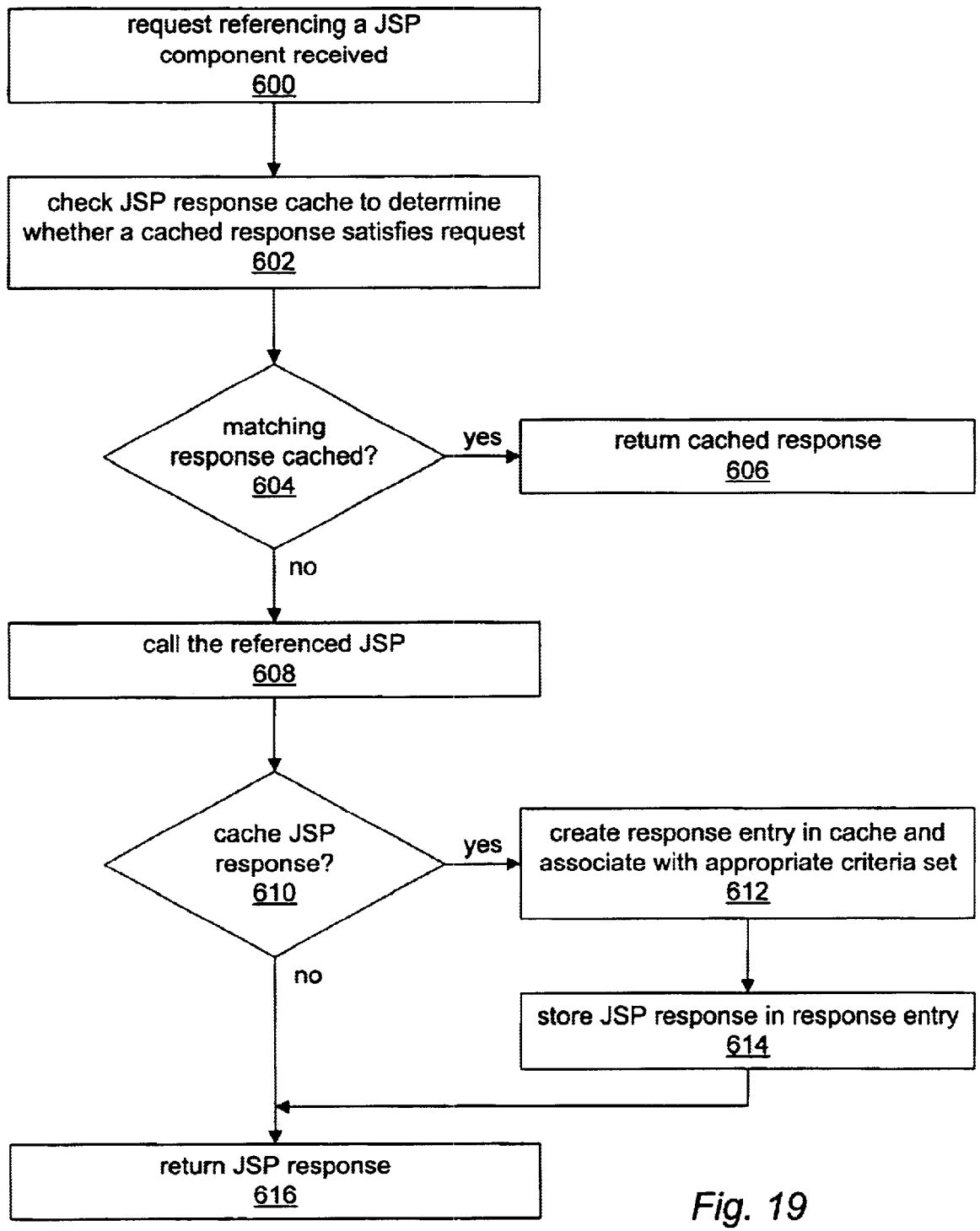
FIG. 19 is a flowchart diagram illustrating one embodiment of a method for enabling JSP response caching.

FIG. 19 is a flowchart diagram illustrating one embodiment of a method for enabling JSP response caching, based on the above description. In one embodiment, the JSP engine manages the process illustrated in FIG. 19.

In step 600 a request referencing a JSP component is received. The request may, for example, have an associated URL that references a JSP. The JSP engine may receive the request from another service or component running on the application server or directly from a client computer.

In step 602 the JSP response cache is checked to determine whether a response in the cache satisfies the request. The JSP response cache may be implemented in any of various ways, and responses and their associated criteria sets may be represented and stored in the cache in any of various ways. As noted above, in one embodiment, a response is stored as a byte array.

As described above, the information received along with the JSP request may include various attributes, such as variable name value pairs. In step 602, these attributes may be compared against the criteria set for each cached response. The comparisons may be performed in various ways, depending on what types of matching criteria are supported in a particular embodiment and how the criteria are stored. The JSP response cache is preferably organized to enable an efficient criteria-matching algorithm. For example, the cache may be organized based on session context such as user ID or role, security context, etc.

In step 604 it is determined whether a matching cached response was found in step 602. If so, then in step 606 the cached response is immediately returned without running the referenced JSP. For example, if responses are stored as byte arrays, then the byte array corresponding to the response whose criteria set matched the request attributes may be retrieved and streamed back.

If no matching cached response was found, then in step 608 the referenced JSP may be called. The JSP engine then executes the JSP, using the attributes included in the request. As described above, depending on the dynamic conditions of the execution, different SetCacheCriteria( ) method calls with different arguments may be encountered during the JSP execution.

In step 610 it is determined whether the JSP response should be cached. For example, if no SetCacheCriteria( ) method calls were encountered during the execution of the JSP, then the response may not be cached. Also, in various embodiments, the application server may enable administrators to utilize a user interface to specify for which application server components the output should be cached. This information may also be checked in step 610.

If the JSP response should not be cached, then the response may simply be returned in step 616, e.g., by streaming back the response.

If the JSP response should be cached, then in step 612 a response entry to represent the response may be created, and in step 614 the JSP response may be stored in the response entry. As noted above, response entries may be implemented in any of various ways. As shown in step 612, the appropriate criteria set, as defined by the arguments of the SetCacheCriteria( ) method calls encountered during the JSP execution may be associated with the response entry. Note that, if multiple SetCacheCriteria( ) method calls are encountered, then multiple response entries corresponding to the method calls may be created.

In step 616 the JSP response is then returned.

It is noted that FIG. 19 represents one embodiment of a method for enabling JSP response caching, and various steps may be added, omitted, combined, modified, reordered, etc. For example, in one embodiment, a step may be added so that the JSP file referenced by the request is checked on the file system to determine whether the file has been modified since the JSP was loaded or since the associated responses were cached. If so, the associated responses may be flushed from the cache, and the JSP may be reloaded and called.

Composite JSPs

With the support described above, composite JSPs, that is JSP files which include other JSPs, can be efficiently implemented. There may be one top-level frame, emitted either from a servlet or from a JSP, which issues one or several RequestDispatcher.include calls for other JSP files. Each of the included JSP files may generate response content. Some of these JSP files may already have associated responses cached, and others may not. For each cached response time, the associated expiration time may vary.
For example, here is a 'compose.jsp' JSP listing:

```
<% setCacheCriteria(1); %>
<HTML>
<HEAD>
    <TITLE>compose (JSP)</TITLE>
</HEAD>
<BODY>
<H2>Channel 1</H2>
<%
    RequestDispatcher disp=
        getServletContext( ).getRequestDispatcher("c1.jsp");
    disp.include(request, response);
%>
<H2>Channel 2</H2>
>%
    disp=getServletcontext( ).getRequestDispatcher
        ("c2.jsp");
    disp.include(request, response);
%>
</BODY>
</HTML>
``` where 'c1.jsp' appears as:
```
<% setCacheCriteria(10); %>
<ul>
<li>Today . . .
. . .
</ul>
``` and 'c2.jsp' appears as:
```
<% setCacheCriteria(2,"x"); %>
<ul>
<li>Tomorrow . . .
. . .
</ul>
```

Note that neither 'c1.jsp' nor 'c2.jsp' emits complete HTML pages, but rather snippets thereof, and that each file has its own caching criteria.
A helper function for including URIs may be provided, so that, for example, the above-listed 'compose.jsp' file may appear as:
```
<% setCacheCriteria(1); %>
<HTML>
<HEAD>
    <TITLE>compose (JSP)</TITLE>
</HEAD>
<BODY>
<H2>Channel 1</H2>
<%
    includeURI("c1.jsp", request, response);
%>
<H2>Channel 2</H2>
<%
%>
    includeURI("c2.jsp", request, response);
</BODY>
</HTML>
```
instead of as the listing shown above.

Events

In various embodiments of application servers, developers can create and use named events. The term event is widely used to refer to user interface actions, such as mouse clicks, that trigger code. However, the events described in this section are not user interface events. Rather, an event is a named action or set of actions that may be registered with the application server. The event may be triggered either at a specified time or may be activated from application code at runtime. For example, the executive server process 202 in the application server 200 of FIG. 3 may be responsible for triggering scheduled events. Typical uses for events include periodic backups, reconciling accounts at the end of the business day, or sending alert messages. For example, one use of an event may be to send an email to alert a company's buyer when inventory levels drop below a certain level. The application server preferably implements the event service to be a high-performance service that scales well for a large number of events.

Each event may have a name, possibly a timer, and one or more associated actions, and possibly associated attributes. For events with multiple actions, an execution order for the actions may be specified. The actions can be configured to execute either concurrently or serially. Possible actions include running an application software component or module such as a Java™ Servlet, sending an email, etc. Administrators can configure events to occur at specific times or at intervals, such as every hour or once a week. Events may also be triggered programmatically by calling the event by name from code, such as a Java™ Servlet, EJB, etc., or a C/C++ component, etc. As noted above, Java and C/C++ components may be handled by separate processes engines. When an event's timer goes off or it is called from code, the associated actions occur. Events may be triggered either synchronously or a synchronously.

It is noted that, since events may be triggered programmatically, portions of application logic may be encapsulated as events, for example by triggering an event which causes a Servlet or other software component to execute. The software component may of course be coded without any knowledge that the component will be called as a result of triggering an event. Also, note that if components are called as a result of triggering an event, the component may run from any server. Calling a component as a result of triggering an event may thus advantageously result in the same benefits described above that the application server provides for components called in other ways, e.g., load balancing, result-caching, etc.

An input list referred to as a ValList may be passed to triggered events. There may be a separation between Attributes and Actions of an event. This ValList comprises entries describing Attributes. Each action of an event is represented by a separate ValList. The event API may provide methods to get/set attributes and also methods to add/delete/enumerate actions.

As described above, multiple application servers may be grouped in a cluster. In one embodiment of the event service, events, or a particular event, may be configured to have a cluster-wide scope, so that they do not need to be defined and registered for every server in the cluster that needs them. Each event may have associated attributes specifying which application server the event should run on, load balancing criteria, etc. Events are preferably stored persistently, e.g. in a registry or a database.

In one embodiment, events may be registered by any application server engine and triggered by any application server engine. Events may be registered on multiple application servers. In one embodiment, event operations such as registration, adding actions, getting attributes, etc. may occur on multiple servers in a single operation, i.e. the event API may support event management across multiple application servers. For example, an event may be created from one application server and then called from another application server.

Event API

This section discusses one embodiment of an API for managing and using events.

To create a new event, use the following procedure:
1. Obtain the event manager object by calling getAppEvent( ). For example:
IAppEvent eventMgr=getAppEvent( );
2. Specify the characteristics of the new event by setting up an IValList object with a set of values, each one being one characteristic of the event. The values required in this object vary depending on whether the event's action is to run an application component, send an email, etc.
3. Inform the application server of the new event by calling registerEvent( ).

For example, the following code sets up an event to send email:
```
IValList eventOutput;
IValList eventInput2=GX.CreateValList( );
String eventName2="ReportEvent";
//Add the ReportAgent appevent name to the vallist
eventInput2.setValString(GX_AE_RE_KEY_NAME.GX_AE_RE_KEY_NAME,
   eventName2);
//Set the appevent state to be enabled
eventInput2.setValInt(GX_AE_RE_KEY_STATE.GX_AE_RE_KEY_STATE,
   GX_AE_RE_ES_FLAG.GX_AE_RE_EVENT_ENABLED);
//Set the appevent time to be 06:00:00 hrs everyday
eventInput2.setValString(GX_AE_RE_KEY_TIME.GX_AE_RE_KEY_TIME,
   "6:0:0 */*/*");
//Set the appevent action to send e-mail to
//report@acme.com
eventInput2.setValString(GX_AE_RE_KEY_MTO.GX_AE_RE_KEY_MTO,
   "report@acme.com");
//The content of the e-mail is in/tmp/report-file
eventInput2.setValString(
GX_AE_RE_KEY_MFILE.GX_AE_RE_KEY_MFILE,
   "/tmp/report-file");
//The e-mail host running the SMTP server is mailsvr
eventInput2.setValString(
GX_AE_RE_KEY_MHOST.GX_AE_RE_KEY_MHOST,
   "mailsvr.acme.com");
//The sender's e-mail address is admin@acme.com
eventInput2.setValString(
GX_AE_RE_KEY_SADDR.GX_AE_RE_KEY_SADDR,
   "admin@acme.com");
//Register the event
if (eventMgr.registerEvent(eventName2, eventInput2)
   !=GXE.SUCCESS)
   return streamResult("Can not register ReportEvent<br>");
```

Triggering an existing event:

Typically, an event is triggered at time intervals which you specify when you create the event. You can also trigger the event at any time from code. The event still occurs at its timed intervals also. Those events that do not have a timer are triggered only when called from code.

To trigger an event:
1. Obtain the event manager object by calling getAppEvent( ). For example:
IAppEvent eventMgr=getAppEvent( );
2. If you want to change any of the characteristics of the event before running it, set up an IValList object with the desired characteristics. Use the same techniques as you did when setting up the event, but include only those characteristics you want to override. For example:
IValList newProps=GX.CreateValList( );
newProps.setValString(GX_AE_RE_KEY_NREQ.GX_AE_RE_KEY_NREQ,
"RunReportV2");
3. To trigger the event, call setEvent( ). For example:
eventMgr.setEvent("ReportEvent",0,newProps);

Deleting an event:

Delete an event when the event and its actions are not meaningful anymore, or if you want to use the event only during the lifetime of an application component execution.

To delete an event:
1. Obtain the event manager object by calling getAppEvent( ). For example:
IAppEvent eventMgr=getAppEvent( );
2. To delete the event permanently, call deleteEvent( ). For example:
eventMgr.deleteEvent("ReportEvent");

Temporarily disabling an event

Disable an event if you don't want it to be triggered during a temporary period. For example, you might not want to generate reports during a company holiday.

To disable and enable an event:
1. Obtain the event manager object by calling getAppEvent( ). For example:
IAppEvent eventMgr=getAppEvent( );
2. To stop the event from running temporarily, call disableEvent( ). For example:
eventMgr.disableEvent("ReportEvent");
3. When you want the event to be available again, call enableEvent( ). For example: eventMgr.enableEvent("ReportEvent");

Getting information about events

To get information about a particular event, call queryEvent( ). This method returns the IValList object that contains the characteristics of the event. To get complete details about all the currently defined events, first call enumEvents( ). This method returns the IValList objects of all the events known to the application server. Then call enumNext( ) to step through the IValList objects returned by enumEvents( ). The enumEvents( ) and queryEvent( ) methods are defined in the IAppEvent interface. The enumNext( ) method is defined in the IEnumObject interface.

Example:
The following code generates a report of all registered events.

```
//Open/tmp/report-file for writing the report
FileOutputStream outFile=null;
outFile=new FileOutputStream("/tmp/report-file");
ObjectOutputStream p=null;
p=new ObjectOutputStream(outFile);
//get appevent manager
IAppEvent appEvent=getAppEvent( );
//Get the Enumeration object containing ValLists for all
//the registered events
IEnumObject enumObj=appEvent.enumEvents( );
//Retrieve the count of registered appevents
Int count=enumObj.enumCount( );
p.writeObject("Number of Registered Events:");
p.writeInt(count);
enumObj.enumReset(0);
while (count>0){
IObject vListObj=enumObj.enumNext( );
IValList vList=(IValList)vListObj;
String name=
vList.getValString(GX__AE__RE__KEY__NAME.GX__AE__RE__KEY__NAME);
p.writeObject("\nDefinitions for AppEvent named");
p.writeObject(name);
p.writeObject("\n");
//Reset the next item to retrieve from ValList to be
//the first one
vList.resetPosition( );//Iterate through all the items in the vallist and
//print them
while ((name=vList.getNextKey( ))!=null){
GXVAL val;
val=vList.getValByRef(name);
p.writeObject("\n\t");
p.writeObject(name);
p.writeObject("=");
p.writeObject(val.toString( ));
}
```

Example interface for event API:
```
interface IGXAppEventMgr{
    HRESULT CreateEvent(
        [in] LPSTR pEventName,
        [out] IGXAppEventObj**appeventObj
    );
    HRESULT RegisterEvent(
        [in] IGXAppEventObj*appEventObj
    );
    HRESULT GetEvent(
        [in] LPSTR pEventName,
        [out] IGXAppEventObj**pAppEvent
    );
    HRESULT TriggerEvent(
        [in] LPSTR pEventName,
        [in] IGXValList*pInValList,
        [in] BOOL syncFlag
    );
    HRESULT EnableEvent(
        [in] LPSTR pEventName
    );
    HRESULT DisableEvent(
        [in] LPSTR pEventName
    );
    HRESULT DeleteEvent(
        [in] LPSTR pEventName
    );
    HRESULT EnumEvents(
        [out] IGXEnumObject**ppEvents
    );
}
```

Descriptions:
CreateEvent
pEventName: name of the event to be registered.
appeventObj: pointer to returned appevent object.
CreateEvent creates a empty appevent object. Attributes and Actions can be set on the returned appeventObj, and then registered with AppEventMgr using RegisterEvent. Note that changes to appeventObj do not take effect until it is registered with the Manager.
RegisterEvent
appeventObj: pointer to appevent object that is to be registered.
Registers a appevent object whose attributes and actions have been setup. All changes to appEventObj are committed to the server, and the registry. If an appevent object already exists for the given name, then that object is deleted and this new object will take its place.
GetEvent
pEventName: name of the event.
appeventObj: pointer to returned appevent object.
GetEvent retrieves a appevent object for a given event name.
TriggerEvent
pEventName: name of the event to be triggered.
pValList: input ValList that is passed to Actions.
syncFlag: boolean flag to denote if event is to be triggered synchronously.
Triggers a specified appevent. A copy of pInValList is passed as input to all actions registered with the appevent.
If the Action is an applogic, then pInValList is passed as input to that applogic.
If the action is a mail, then pInValList is currently simply ignored.
If the action is a Servlet, then the entries of the input vallist are available as attributes of ServletRequest object that is passed to the Servlet.
If syncFlag is FALSE, then the event is triggered, and the call immediately returns without waiting for the actions to complete execution. If the flag is TRUE, then this call blocks until the event is triggered and all actions are executed.
Actions are triggered exactly in the order they have been added to the appevent object.
EnableEvent
pEventName: name of the event.
Enables a appevent.
DisableEvent
pEventName: name of the event.
Disables a appevent.
DeleteEvent
pEventName: name of the event.
Delete a appevent from the system and the registry.
EnumEvents
ppEvents: pointer to returned enum object.
Enumerates all appevents that are registered with the server. Each element of the returned
Enum object contains a appevent object (of type IGXAppEventObj).

```
interface IGXAppEventObj{
    HRESULT GetName(
        [out, size is(nName)] LPSTR pName,
        [in, default_value(256)] ULONG nName
```

```
);
HRESULT SetAttributes(
   [in] IGXValList*attrList
);
HRESULT GetAttributes(
   [out] IGXValList**attrList
);
HRESULT AddAction(
   [in] IGXValList*action
);
HRESULT DeleteActions(
);
HRESULT EnumActions(
   [out] IGXEnumObject**actions
);
};
```
GetName
pName: pointer to a input buffer.
nName: size of input buffer.
Gets the name of the appevent. The name is set when the object is created with CreateEvent( ).
SetAttributes
attrList: input attribute vallist.
Sets the attribute ValList of the appevent. Note that changes to an appevent object are not committed until it is registered with the AppEventMgr.
GetAttributes
attrList: pointer to returned attribute vallist.
Gets the attribute vallist of a appevent.
AddAction
action: input action vallist.
AddAction appends an action to a ordered list of actions. When an event is triggered, the actions are executed exactly in the order they have been added. ValList entries describe the action being added, and vary from one type to another.
DeleteActions
Delete all actions added to this appevent object.
EnumActions
actions: pointer to returned enum object.
Enumerates actions added to this appevent object. Each entry in the returned enum object is a action vallist of type IGXValList.
Sample portion of registry:

```
6   EVENTS2      0
7   tstEv1       0
0   Enable    4     1
0   ActionMode 4    1
0   Time   1    *:0,10,20,30,40,50:0 */*/*
0   ActionCount 4    4
8   1            0
0   Sequence   4     1
0   NewReq   1   GUIDGX-{754CE8F7-8B7A-153F-C38B-
                 0800207B8777}
8   2            0
0   Sequence   4     2
0   ServletReq  1   HelloWorldServlet?arg1=val1&argu2=valu2
8   3            0
0   Sequence   4     3
0   MailFile   1   /u/rchinta/appev.mail
0   SenderAddr  1   rchinta
0   MailHost   1   nsmail-2
0   ToList  1   rchinta
8   4            0
0   Sequence   4     4
```

-continued

```
0   NewReq   1   GUIDGX-{754CE8F7-8B7A-153F-C38B-
                 0800207B8777}
7   tstEv2       0
0   Enable    4     1
0   Time   1    *:8:0 */*/*
0   ActionCount 4    1
8   1            0
0   Sequence   4     1
0   NewReq   1   GUIDGX-{754CE8F7-8B7A-153F-C38B-
                 0800207B8777} ? p1=hello0
```

Request Steps

In various embodiments, an application server may handle requests using a workflow model of defining a series of steps for each type of request. As a simple example, consider the application server architecture shown in FIG. 3, in which a request of four steps is processed. The first step may be to determine the appropriate entity to handle the request. For example, the executive server 202 may broker a request to the Java server 204 if the request references a Java™ component, or to the C/C++ server 206 if the request references a C++ component, etc. At another level, the Java server 204 may determine which Java™ component should handle a request. Thus, request steps may have different meanings in different contexts.

Continuing the example, the second step may be to load the entity found in step 1 above. For example, the Java server 204 engine may instantiate the appropriate Java™ object. Some steps may not apply in certain contexts. For example, step 2 may not apply to an executive server-level request, since the appropriate server pr process to hand off a request to is probably already running.

The third step may be to "run" the entity using the request context, e.g. request parameters. For example, this run step for the executive server may mean to send the request data to the Java server and await the results. For the Java server, this run step may mean to run the Java™ component on the Java™ virtual machine.

The fourth step may be to stream back the results generated in the third step to the originating requestor.

Different step lists may be defined for each type of request. For example, the step list for a request referencing an Enterprise JavaBean™ may be different from the step list for a request referencing a Java™ Servlet.

This method of representing requests as a series of steps provides advantages such as the flexibility of weaving steps in any way desired for a given level. Also, steps may be easily added into the step list. For example, while traditional programming models may require code to be recompiled or reloaded in order to alter request logic, the step model allows a new step to simply be added.

Request Queueing

Each request received from clients such as web servers may be packaged in a data packet having a particular format. According to this format, a field in the data packet may specify a sub-protocol. This sub-protocol may specify which step list to use for the request.

A request manager service and queue and thread managers are discussed above with reference to FIG. 4. If a request needs to be queued, for example if all the request-handling threads are busy processing requests, then the request may be placed into different queues based on the type of request.

A thread pool may be associated with each request queue. Threads in different thread pools may have different characteristics. For example, requests requiring XA behavior, as defined by the XA standard protocol, may be placed in a request queue that has an associated thread pool comprising XA-enabled threads. If at some point while a request is being processed it is determined that the request needs to be handled by a different thread, then the request may be re-queued in the appropriate queue. For example, if a non-XA-enabled thread is processing a request, and the application logic determines that the request now requires XA behavior, then the request may be requeued into a request queue with an associated thread pool comprising XA-enabled threads. Optimizations are preferably performed so that the request does not have to repeat the entire overhead of being taken from the network stack, unmarshaled, etc.

Logging Facility

In various embodiments, the application server may provide a robust, flexible logging facility, as described in this section. When logging is enabled, messages generated by application-level and system-level services may be logged. These messages describe the events that occur while a service or application is running. For example, each time the server communicates with a database, the logging facility may record the resulting messages generated by a database access service.

Determining Types of Messages to Log

Various types of messages may be logged. In one embodiment, messages are categorized into the following types:
  Information message. Describes the processing of a request or normal service activity, such as a status update.
  Warning message. Describes a non-critical problem that might be an indication to a larger problem. For example, when a service is unable to connect to a process, a warning message may be logged.
  Error message. Describes a critical failure of a service, from which recovery is not likely. For example, when a service encounters a critical problem, such as a pipe closure.

A user interface may be provided to manage message logging, e.g. enabling/disabling logging, specifying the types of messages to log, etc. An example of a user interface to manage message logging is shown in FIG. 20. In FIG. 20, the Maximum Entries field specifies the maximum number of entries that can exist before data is written to the log. The Write Interval field specifies the amount of time (in seconds) that elapses before data is written to the log. The Message Type field specifies which types of messages should be logged (informational messages, warnings, and/or errors.)

Log Message Format

In one embodiment, log messages has the following four components:
  date and time the message was created
  message type, such as information, warning, or error
  service or application component ID generating message
  message text Logging Destination The logging service can preferably be configured to record server and application messages in any or all of the following destinations:

Process consoles. By default, the process consoles may display log messages as they are generated. If logging is enabled and the server is enabled for automatic startup (UNIX) or interaction with the desktop (NT), the consoles open and display the log messages. This feature can be disbaled by deselecting the Log to Console checkbox.

Application log. The default application log file. For Windows NT, this may be viewable through the Event Viewer. This is the default. Provides a more comprehensive record of the server and application error messages. Warning and information messages are not logged to the application log. All messages are sorted by their timestamp.

ASCII text file. An ASCII text file, which the user can create and specify. Used for a more permanent record of the server and application messages. All messages are sorted by their timestamp.

Database table. A database table which can be created and specified. This may be the most versatile logging destination and can be used when it is desired to sort, group, and create reports of the logged messages.

In one embodiment, the server may use a log buffer to store messages before they are written to the application log, an ASCII file, and/or database logs. This buffer optimizes the performance of the application server by limiting the use of resources to continually update a log. The buffer is written to the destination when either the buffer interval times out or the number of entries in the buffer exceeds the maximum number allowed.

The following messages sent to an ASCII text file illustrate exemplary formats of text messages:

[11/18/97 11:11:12:0] info (1): GMS-017: server shutdown (host 0xc0a801ae, port 10818, group 'MIS')—updated host database

[11/18/97 11:11:18:2] warning (1): GMS-019: duplicate server (host 0xc0a8017f, port 10818) recognized, please contact sales representative for additional licenses Logging to a Database If messages are to be logged to a database, an event log database table may be created. FIG. 21 illustrates an exemplary type of database table for logging messages. On some systems, supplied scripts may be used for automatically setting up database tables. The application server logging service may map the message elements to the database fields listed in the table.

File Rotation

As shown in FIG. 20, the application server logging facility may be configured to rotate ASCII log files at scheduled time intervals. When a log file is rotated, the existing log file may be closed and moved to an archive location, and a new log file may be created for recording further log events. Since log files are stamped with the time and date they are created, log file rotation helps organize log files into manageable units. The times at which the log files should be rotated may be specified using a regular time interval, as illustrated in FIG. 20, or using a string expression, e.g., by typing a string into the field shown. In one embodiment, a string expression should be of the format:

hh:mm:ss W/DD/MM where the following table explains each element of the expression:

| Element | Explanation | Possible Values |
| --- | --- | --- |
| hh | hour of the day | 0–23 |
| mm | minute | 0–59 |
| ss | seconds | 0–59 |
| W | day of the week | 0–6 (0 for Sunday) |
| DD | day of the month | 1–31 |
| MM | month | 1–12 |

Each of these fields may be either an asterisk or a list of elements separated by commas. An element is either a number or two numbers separated by a minus sign, indicating an inclusive range. An asterisk specifies all legal values for that field. For example, the expression:
2, 5–7:0:0 5/*/*
specifies that logging should be rotated at 2:00am, 5:00am, 6:00am and 7:00am every Friday. The specification of days can be made by two fields: day of the month (DD) and day of the week (W). If both are specified, then both may take effect. For example, the expression:
1:0:0 1/15/*
specifies that logging to a new file starts at 1:00am every Monday, as well as on the fifteenth of each month. To specify days by only one field, the other field may be set to "*".

In one embodiment, the following environment entries, which may be implemented as registry entries, are provided to manage log file rotation. A user interface such as shown in FIG. 20 may be provided to set these entries.

EnableRotation: Log file rotation will be enabled when set to "1", or disabled when set to "0". By default, log file rotation is disabled.

RotateTime: An expression string denoting the time at which the log file is to be rotated.

TextPath: In one embodiment, when log file rotation is not enabled, the name of each log file is based on the value of the TextPath entry, plus the process ID of the logging process. When log file rotation is enabled, the name of each log file is based on the value of the TextPath entry, plus the process ID, plus the time at which the file is created. A file name may be of the format <TextPath>_<process-id>_<time-created>, where <TextPath> is the value of the TextPath entry, <process-id> is the id of the logging process, and <time-created> is the time at which logging to the file started.

Logging Web Server Requests

The application server may be configured to log web server requests. For example, a web server plug-in such as shown in FIG. 4 may send requests to the application server where they are processed. By logging web server requests, request patterns and other important request information may be tracked.

Web server requests may include HTTP requests. A web server HTTP request may be divided into standardized HTTP variables used by the web server to manage requests. The application server may include these or a subset of these HTTP variables to be logged. Variables may be added to the list if additional log information is desired. In one embodiment, each HTTP variable is mapped to a field name in a database table. FIG. 22 illustrates an exemplary type of database table for logging web server requests. On some systems, supplied scripts may be used for automatically setting up such a table.

Note that FIG. 22 illustrates a field name of "logtime" in the database table. The application server logging service may record the time that the message is created in the logtime database field. Note that database field name may be renamed. The fields from the database table may be automatically mapped to web server variables in the registry.

Out of Storage Space Condition

One problem that is not handled well, or not handled at all, by many application server logging facilities is an out-of-storage-space condition, such as an out-of-disk-space condition. Since many other logging facilities do not handle an out-of-storage-space condition gracefully, this condition causes many other application servers to fail, e.g. by crashing.

Thus, when running out of storage space, the application server may automatically suspend logging until more storage space becomes available. Logging may then resume when storage space becomes available. In one embodiment, it is guaranteed that when the application server suspends logging for lack of storage space, a message to that effect will be written to the log file. The application server logging facility may reserve a certain amount of disk space to write such a message if necessary. The logging facility may suspend logging for the duration of the out-of-storage space condition, and then automatically resume logging when the condition is corrected. The application server logging facility may monitor the amount of available storage space, e.g. via a task that wakes up periodically and performs this check.

Figure 23:
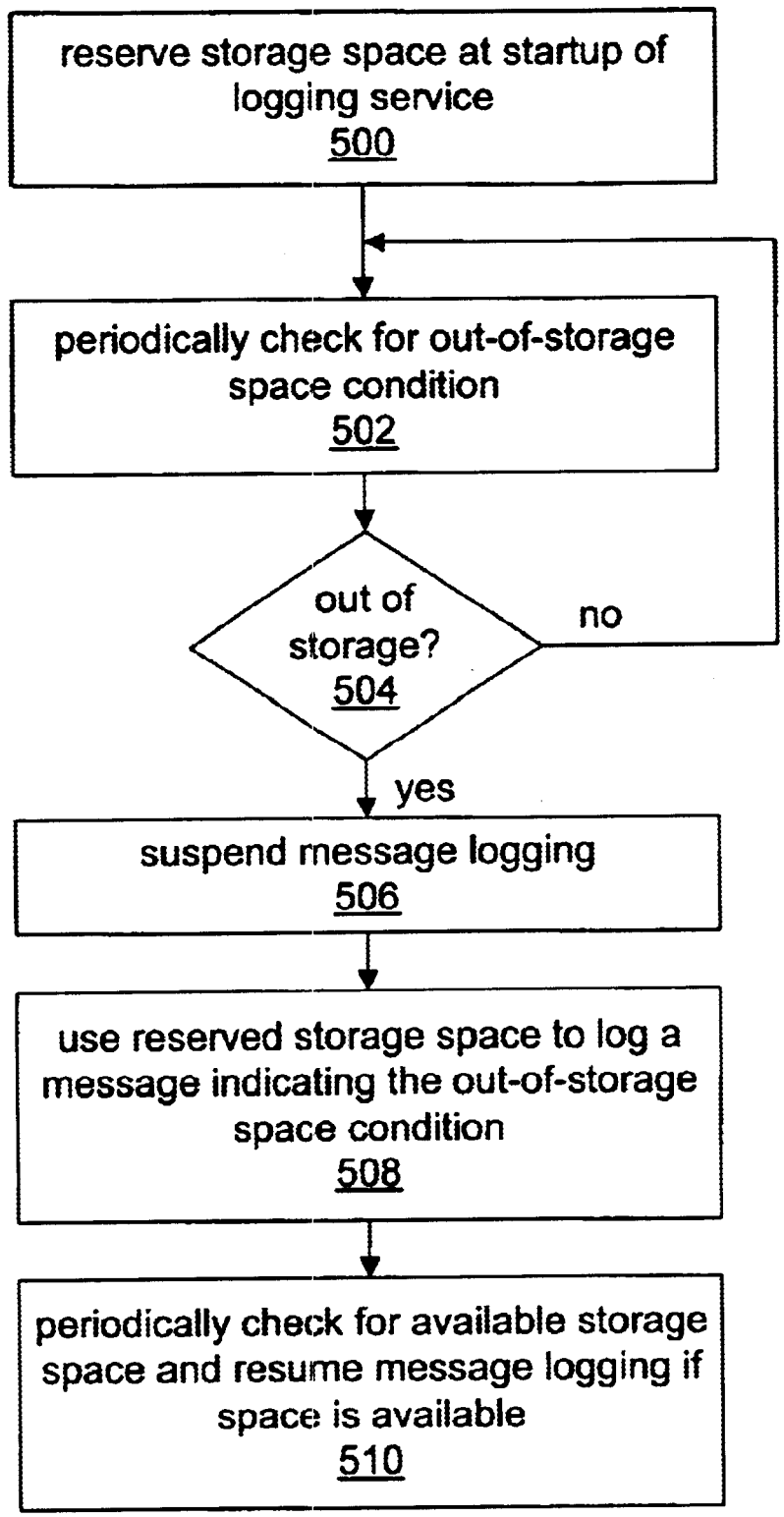
FIG. 23 is a flowchart diagram illustrating one embodiment of a method for handling out-of-storage-space conditions when logging messages.

FIG. 23 is a flowchart diagram illustrating one embodiment of a method for handling out-of-storage-space conditions. As shown, in step 500, an amount of storage space may be reserved, e.g., at the startup time of the logging service. This storage space may be disk space or another type of media storage space, depending on where messages are logged. The amount of storage space reserved may vary, but is preferably a relatively small amount suitable for logging an out-of-storage space condition message, as described below. The storage space may be reserved in any of various ways, depending on the particular operating system, programming language, etc.

As shown in steps 502 and 504, the amount of storage space currently available may be checked periodically. For example, the logging service may create a thread that wakes up periodically and performs this check.

If an out-of-storage-space condition is detected, then message logging may be suspended, as shown in step 506. In one embodiment, the logging service may simply ignore requests by client processes to log messages while message logging is suspended. The logging service may return an error code to the client indicating that the message was not logged.

In step 508, a message indicating the out-of-storage-space condition may be logged, using the storage space reserved in step 500. In various embodiments, other actions may also be taken in response to an out-of-storage space condition. For example, an administrator may be alerted via an email, a page, etc.

As shown in step 510, the logging service may periodically check for available storage space and may resume message logging if storage space becomes available. For example, a thread may periodically wake up to perform this check. Upon resuming message logging, the logging service may of course reserve storage space for logging an out-of-storage-space condition again if necessary.

As noted above, FIG. 23 represents one embodiment of a method for handling out-of-storage-space conditions, and various steps may be added, combined, altered, etc. For example, the logging service may be operable to check for declining storage space and may alert an administrator, e.g., via an email, before such a low level of storage space is reached that message logging suspension becomes necessary. As another example, in one embodiment, the logging service may queue logging requests received from client processes in memory while message logging is suspended and may attempt to log the messages once storage space becomes available.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for caching JavaServer Page (JSP) component responses, the method comprising:
   receiving a first request referencing a JSP component;
   executing the JSP component in response to receiving the first request,
      wherein said executing the JSP component comprises specifying caching criteria to associate with a response resulting from said executing the JSP component;
   storing the response resulting from said executing the JSP component in a cache,
      wherein said storing the response resulting from said executing the JSP component in a cache comprises associating the caching criteria with the response;
   returning the response resulting from said executing the JSP component as the results for the first request;
   receiving a second request referencing the JSP component;
   retrieving the response resulting from said executing the JSP component from the cache in response to receiving the second request;
   returning the response resulting from said executing the JSP component as the results for the second request.

2. The method of claim 1,
   wherein the caching criteria includes a "time" argument indicating a length of time for which the response resulting from said executing the JSP component should be considered valid.

3. The method of claim 1,
   wherein the caching criteria includes a "constraint set" argument specifying a set of constraints that must be satisfied in order for the response resulting from said executing the JSP component to be considered valid.

4. The method of claim 1,
   wherein the second request comprises one or more attributes;
   wherein, in response to receiving the second request, the one or more attributes are matched against the caching criteria associated with the response;
   wherein said retrieving and returning the response resulting from said executing the JSP component are performed only if said matching is successful.

5. The method of claim 1,
   wherein said specifying the caching criteria comprises processing tags included in the JSP component code.

6. The method of claim 1,
   wherein said specifying the caching criteria comprises invoking a method specified by the JSP component.

7. The method of claim 1,
   wherein the JSP component is a component that executes on an application server.

8. A system for caching JavaServer Page (JSP) component responses, the system comprising:
   a client computer connected via a network to an application server computer;
   a JSP component that runs on the application server computer;
   wherein the application server computer is operable to:
      receive a first request referencing the JSP component from the client computer;
      execute the JSP component in response to receiving the first request,
         wherein said executing the JSP component comprises specifying caching criteria to associate with a response resulting from said executing the JSP component;
      store the response resulting from said executing the JSP component in a cache,
         wherein said storing the response resulting from said executing the JSP component in a cache comprises associating the caching criteria with the responses
      return the response resulting from said executing the JSP component as the results for the first request;
      receive a second request referencing the JSP component from the client computer;
      retrieve the response resulting from said executing the JSP component from the cache in response to receiving the second request;
      return the response resulting from said executing the JSP component as the results for the second request.

9. The system of claim 8,
   wherein the caching criteria includes a "time" argument indicating a length of time for which the response resulting from said executing the JSP component should be considered valid.

10. The system of claim 8,
    wherein the caching criteria includes a "constraint set" argument specifying a set of constraints that must be satisfied in order for the response resulting from said executing the JSP component to be considered valid.

11. The system of claim 8,
    wherein the second request comprises one or more attributes;
    wherein, in response to receiving the second request, the one or more attributes are matched against the caching criteria associated with the response;
    wherein said retrieving and returning the response resulting from said executing the JSP component are performed only if said matching is successful.

12. The system of claim 8,
    wherein said specifying the caching criteria comprises processing tags included in the JSP component code.

13. The system of claim 8,
    wherein said specifying the caching criteria comprises invoking a method specified by the JSP component.

14. A memory medium comprising program instructions operable to:
    receive a first request referencing a JSP component;
    execute the JSP component in response to receiving the first request,
       wherein said executing the JSP component comprises specifying caching criteria to associate with a response resulting from said executing the JSP component;
    store the response resulting from said executing the JSP component in a cache wherein said storing the response resulting from said executing the JSP component in a cache comprises associating the caching criteria with the responses;

return the response resulting from said executing the JSP component as the results for the first request;

receive a second request referencing the JSP component;

retrieve the response resulting from said executing the JSP component from the cache in response to receiving the second request;

return the response resulting from said executing the JSP component as the results for the second request.

15. The memory medium of claim 14, wherein the caching criteria includes a "time" argument indicating a length of time for which the response resulting from said executing the JSP component should be considered valid.

16. The memory medium of claim 14, wherein the caching criteria includes a "constraint set" argument specifying a set of constraints that must be satisfied in order for the response resulting from said executing the JSP component to be considered valid.

17. The memory medium of claim 14, wherein the second request comprises one or more attributes;

wherein, in response to receiving the second request, the one or more attributes are matched against the caching criteria associated with the response;

wherein said retrieving and returning the response resulting from said executing the JSP component are performed only if said matching is successful.

18. The memory medium of claim 14, wherein said specifying the caching criteria comprises processing tags included in the JSP component code.

19. The memory medium of claim 14, wherein said specifying the caching criteria comprises invoking a method specified by the JSP component.

20. The memory medium of claim 14, wherein the JSP component is a component that executes on an application server.

* * * * *

UNITED STATES PATENT AND TRADEMARK OFFICE
CERTIFICATE OF CORRECTION

PATENT NO. : 6,697,849 B1
DATED : February 24, 2004
INVENTOR(S) : Carlson

It is certified that error appears in the above-identified patent and that said Letters Patent is hereby corrected as shown below:

Column 42,
Line 20, please change "responses" to -- response; --.

Column 43,
Line 3, please change "responses" to -- response --.

Signed and Sealed this

Thirteenth Day of July, 2004

JON W. DUDAS
*Acting Director of the United States Patent and Trademark Office*